United States Patent
Feit et al.

(10) Patent No.: US 11,549,680 B2
(45) Date of Patent: Jan. 10, 2023

(54) MIRROR WITH LIGHT EMITTING ELEMENTS AND STAND

(71) Applicant: FEIT ELECTRIC COMPANY, INC., Pico Rivera, CA (US)

(72) Inventors: Aaron Feit, Encino, CA (US); John D. Mitchell, Jr., Andover, MA (US)

(73) Assignee: FEIT ELECTRIC COMPANY, INC., Pico Rivera, CA (US)

( * ) Notice: Subject to any disclaimer, the term of this patent is extended or adjusted under 35 U.S.C. 154(b) by 0 days.

(21) Appl. No.: 17/370,577

(22) Filed: Jul. 8, 2021

(65) Prior Publication Data

US 2022/0010954 A1    Jan. 13, 2022

Related U.S. Application Data

(60) Provisional application No. 63/049,381, filed on Jul. 8, 2020.

(51) Int. Cl.
| | | |
|---|---|---|
| *F21V 33/00* | (2006.01) | |
| *F21V 5/00* | (2018.01) | |
| *F21V 23/00* | (2015.01) | |
| *F21V 23/06* | (2006.01) | |
| *F21V 29/70* | (2015.01) | |

(Continued)

(52) U.S. Cl.
CPC .............. *F21V 33/004* (2013.01); *F21V 5/00* (2013.01); *F21V 23/009* (2013.01); *F21V 23/04* (2013.01); *F21V 23/06* (2013.01); *F21V 29/508* (2015.01); *F21V 29/70* (2015.01); *G02B 5/08* (2013.01); *F21Y 2115/10* (2016.08)

(58) Field of Classification Search
CPC ................ F21V 33/004; F21V 23/009; F21W 2131/302; G02B 5/08
See application file for complete search history.

(56) References Cited

U.S. PATENT DOCUMENTS

| | | | |
|---|---|---|---|
| 1,110,475 A | | 9/1914 | Baier |
| 1,138,552 A | * | 5/1915 | Goddard ................. F21V 33/00 362/141 |

(Continued)

FOREIGN PATENT DOCUMENTS

| | | |
|---|---|---|
| CN | 2379638 Y | 5/2000 |
| CN | 3357935 | 3/2004 |

(Continued)

OTHER PUBLICATIONS

Amazon, "Zadro 8X/1X Dual-Sided Lighted Vanity Mirror, Satin Nickel, Model RDV68", retrieved from the Internet at <https://www.amazon.com/Zadro-Dual-Sided-Lighted-Vanity-Mirror/dp/B000UZMWOC> on Aug. 13, 2020, 10 pages.

(Continued)

*Primary Examiner* — Ismael Negron
(74) *Attorney, Agent, or Firm* — Alston & Bird LLP

(57) ABSTRACT

A mirror apparatus includes a reflective module defining an interior and an exterior, at least a first reflection surface provided in the reflective module, a plurality of LED packages provided on a flexible circuit board disposed within the reflective module interior along the periphery of the first reflection surface, a base configured to house power components, and a coupling arm coupled to the base and to the reflective module to support such module.

24 Claims, 19 Drawing Sheets

(51) Int. Cl.
*G02B 5/08* (2006.01)
*F21V 29/508* (2015.01)
*F21V 23/04* (2006.01)
*F21Y 115/10* (2016.01)

(56) References Cited

U.S. PATENT DOCUMENTS

| | | | |
|---|---|---|---|
| 1,592,878 A | 7/1926 | Whittington | |
| 1,761,393 A * | 6/1930 | Hoegger | A45D 42/10 248/475.1 |
| 1,973,234 A | 9/1934 | Tsavaris | |
| 2,404,564 A | 7/1946 | Boehlke | |
| 2,584,472 A | 2/1952 | Konet | |
| 2,991,351 A | 7/1961 | Haines | |
| 2,997,574 A | 8/1961 | Miskella | |
| 3,435,199 A | 3/1969 | Ely | |
| 3,675,187 A | 7/1972 | Christman | |
| 3,780,444 A | 12/1973 | Taylor | |
| 3,837,229 A | 9/1974 | Stiles et al. | |
| 4,097,919 A | 6/1978 | Bobrick et al. | |
| 4,420,711 A * | 12/1983 | Takahashi | H04S 7/40 315/296 |
| 4,719,549 A | 1/1988 | Apel | |
| 4,772,991 A | 9/1988 | Wood | |
| 4,992,704 A * | 2/1991 | Stinson | H05B 45/40 362/800 |
| 5,420,482 A * | 5/1995 | Phares | H05B 47/155 315/300 |
| 5,453,915 A | 9/1995 | Bradley, III | |
| 5,997,149 A | 12/1999 | Chu | |
| 6,053,621 A | 4/2000 | Yoneda | |
| 6,183,263 B1 | 2/2001 | Tacchi et al. | |
| 6,273,585 B1 | 8/2001 | Wu | |
| 6,371,637 B1 | 4/2002 | Atchinson et al. | |
| 6,777,891 B2 * | 8/2004 | Lys | H05B 47/155 315/291 |
| 6,837,595 B2 | 1/2005 | Yoneda | |
| 6,848,822 B2 | 2/2005 | Ballen et al. | |
| 7,004,599 B2 * | 2/2006 | Mullani | A45D 42/10 359/488.01 |
| 7,048,406 B1 * | 5/2006 | Shih | A45D 42/10 362/135 |
| 7,086,756 B2 | 8/2006 | Maxik | |
| 7,255,459 B2 | 8/2007 | Kuan et al. | |
| 7,393,115 B2 | 7/2008 | Tokushita et al. | |
| 7,559,664 B1 | 7/2009 | Walleman et al. | |
| 7,781,789 B2 | 8/2010 | DenBaars et al. | |
| 7,806,540 B2 | 10/2010 | Yoneda | |
| D646,493 S | 10/2011 | Yang et al. | |
| 8,162,502 B1 | 4/2012 | Zadro | |
| D661,910 S | 6/2012 | Yang et al. | |
| 8,356,908 B1 * | 1/2013 | Zadro | F21V 33/004 362/135 |
| 8,625,023 B2 * | 1/2014 | Rolston | G03B 15/06 348/371 |
| D699,448 S | 2/2014 | Yang et al. | |
| D699,952 S | 2/2014 | Yang et al. | |
| D701,050 S | 3/2014 | Yang et al. | |
| 8,735,922 B2 | 5/2014 | Tsai | |
| D736,001 S | 8/2015 | Yang et al. | |
| D737,060 S | 8/2015 | Yang et al. | |
| 9,240,529 B2 | 1/2016 | DeMille et al. | |
| D751,829 S | 3/2016 | Yang et al. | |
| D754,446 S | 4/2016 | Yang et al. | |
| 9,347,660 B1 | 5/2016 | Zadro | |
| D785,345 S | 5/2017 | Yang et al. | |
| 9,638,410 B2 | 5/2017 | Yang et al. | |
| 9,859,464 B2 | 1/2018 | DeMille et al. | |
| 9,897,306 B2 | 2/2018 | Yang et al. | |
| D816,350 S | 5/2018 | Yang et al. | |
| 10,076,176 B2 | 9/2018 | Yang et al. | |
| 10,217,916 B2 | 2/2019 | Nakamura et al. | |
| D845,652 S | 4/2019 | Yang et al. | |
| D846,288 S | 4/2019 | Yang et al. | |
| 10,869,537 B2 * | 12/2020 | Yang | A45D 42/10 |
| 11,026,497 B2 * | 6/2021 | Yang | A45D 42/04 |
| 2002/0094231 A1 | 7/2002 | Lee | |
| 2007/0086183 A1 | 4/2007 | Foster et al. | |
| 2008/0278935 A1 | 11/2008 | Lin | |
| 2009/0051779 A1 | 2/2009 | Rolston | |
| 2009/0097252 A1 | 4/2009 | Liou et al. | |
| 2009/0129121 A1 | 5/2009 | Yoneda | |
| 2009/0135602 A1 | 5/2009 | Liu et al. | |
| 2010/0118520 A1 | 5/2010 | Stern et al. | |
| 2019/0328161 A1 * | 10/2019 | Wei | F21V 23/003 |

FOREIGN PATENT DOCUMENTS

| | | |
|---|---|---|
| CN | 2925206 Y | 7/2007 |
| CN | 200950890 Y | 9/2007 |
| CN | 300746709 | 2/2008 |
| CN | 101160003 A | 4/2008 |
| CN | 101382025 A | 3/2009 |
| CN | 300973066 S | 8/2009 |
| CN | 300983799 S | 8/2009 |
| CN | 300990023 S | 8/2009 |
| CN | 301001894 S | 9/2009 |
| CN | 301108997 S | 1/2010 |
| CN | 301209880 S | 5/2010 |
| CN | 101787830 A | 7/2010 |
| CN | 301278203 S | 7/2010 |
| CN | 301340032 S | 9/2010 |
| CN | 301502988 S | 4/2011 |
| CN | 102057756 A | 5/2011 |
| CN | 301583101 S | 6/2011 |
| CN | 301811715 S | 1/2012 |
| CN | 302103915 S | 10/2012 |
| CN | 302140631 S | 10/2012 |
| CN | 302140632 S | 10/2012 |
| CN | 101787830 B | 1/2013 |
| CN | 302337970 S | 3/2013 |
| CN | 302363850 S | 3/2013 |
| CN | 302396166 S | 4/2013 |
| CN | 103300590 A | 9/2013 |
| CN | 302638575 S | 11/2013 |
| CN | 302668773 S | 12/2013 |
| CN | 106377049 A | 2/2017 |
| DE | 2924529 A1 | 1/1981 |
| DE | 29904039 U1 | 6/1999 |
| DE | 20014279 U1 | 2/2001 |
| DE | 102004042929 A1 | 3/2006 |
| DE | 202007013393 U1 | 12/2007 |
| DE | 102006060781 A1 | 4/2008 |
| DE | 202009004795 U1 | 9/2009 |
| DE | 202010000170 U1 | 7/2010 |
| DE | 202012103555 U1 | 2/2014 |
| EP | 1239215 A2 | 11/2002 |
| EP | 1792553 A2 | 6/2007 |
| EP | 1843402 A1 | 10/2007 |
| EP | 1875837 A1 | 1/2008 |
| FR | 2788951 A1 | 8/2000 |
| JP | 2003-59305 A | 2/2003 |
| JP | 2004-290531 A | 10/2004 |
| JP | 2008-73174 A | 4/2008 |
| JP | 4076329 B2 | 4/2008 |
| KR | 3003306920000 | 7/2003 |
| KR | 3005078730000 | 9/2008 |
| KR | 3005863410000 | 1/2011 |
| KR | 3006924520000 | 5/2013 |
| KR | 3007120860000 | 10/2013 |
| WO | WO 2005/019725 A1 | 3/2005 |
| WO | WO 2007/023891 A1 | 1/2007 |

OTHER PUBLICATIONS

Amazon, "Zadro 8X/1X Dual-Sided Lighted Vanity Mirror, Satin Nickel, Model RDV68, Customer Reviews", retrieved from the Internet at <https://www.amazon.com/Zadro-Dual-Sided-Lighted-Vanity-Mirror/product-reviews/B000UZMWOC/ref=cm_cr_getr_d_paging_btm_next_6?ie=UTF8&r . . . > on Aug. 13, 2020, 3 pages.

(56) References Cited

OTHER PUBLICATIONS

Mercotac, "Rotary Electrical Connectors vs. Brush Slip Rings", Mercotac.com/html/products, Jan. 17, 2002 to May 16, 2020, retrieved from the Internet Archive at <URL: web.archive.org/web/20070403124610/http://www.mercotac.com/html/products.html> on Aug. 13, 2020 2 pages.

Mercotac, "Using Slip Rings?", Mercotac.com, Dec. 19, 1996 to Feb. 2, 2020, retrieved from the Internet Archive at <URL: web.archive.org/web/20070315073405/http://www.mercotac.com> on Aug. 13, 2020, 2 pages.

Web Plus Beauty, "Zadro Lighted Make-up Mirror 1X/8X Dual Sided Pedestal (ZLD48)", retrieved from the Internet at <https://http://www.webplusbeauty.com/g5397600.html>, on Oct. 29, 2021, 1 page.

Youtube, "How to Replace the Bulbs (FB581) on the Zadro Surround Light™ Dual-Sided Pedestal Vanity Mirror 10X/1X, Model: SVL410", (video, online), on the Internet at <https://www.youtube.com/watch?v=5s6QYUjUH3s>, retrieved on Oct. 13, 2021, 3 pages.

Zadro Products, Inc., "How to: Zadro Z'Beauty Lighted Vanity Mirror Bulb Replacement", (Blog) retrieved from the Internet at <URL: https://zadroinc.com/zadro-blog/how-to-zadro-zbeauty-lighted-vanity-mirror-bulb-replacement-/> on Aug. 13, 2020, 2 pages.

Zadro Products Inc., "Lighted Dual Sided Pedestal IX & 8X Mirror", Zadroinc.com, Apr. 29, 2003 to May 9, 2006, retrieved from the Internet Archive at <URL: web.archive.org/web/20050826120940/http://www.zadroinc.com:80/Merchant2/merchant.mv?Screen=PROD&Store_Code=Zadro&Product_Code=ZLD48&Category_Code=ZadroSL2K>, on Aug. 13, 2020, 2 pages.

* cited by examiner

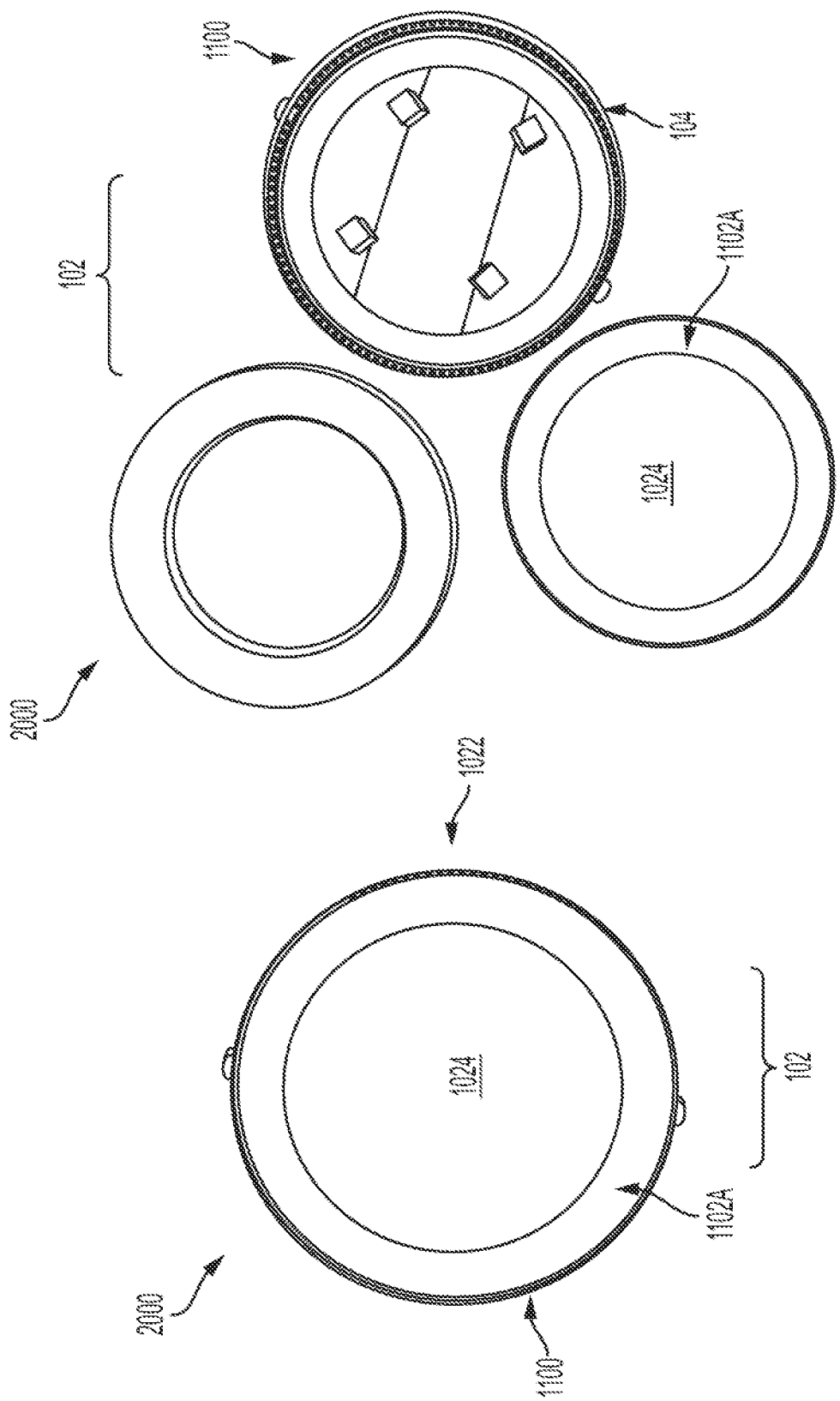

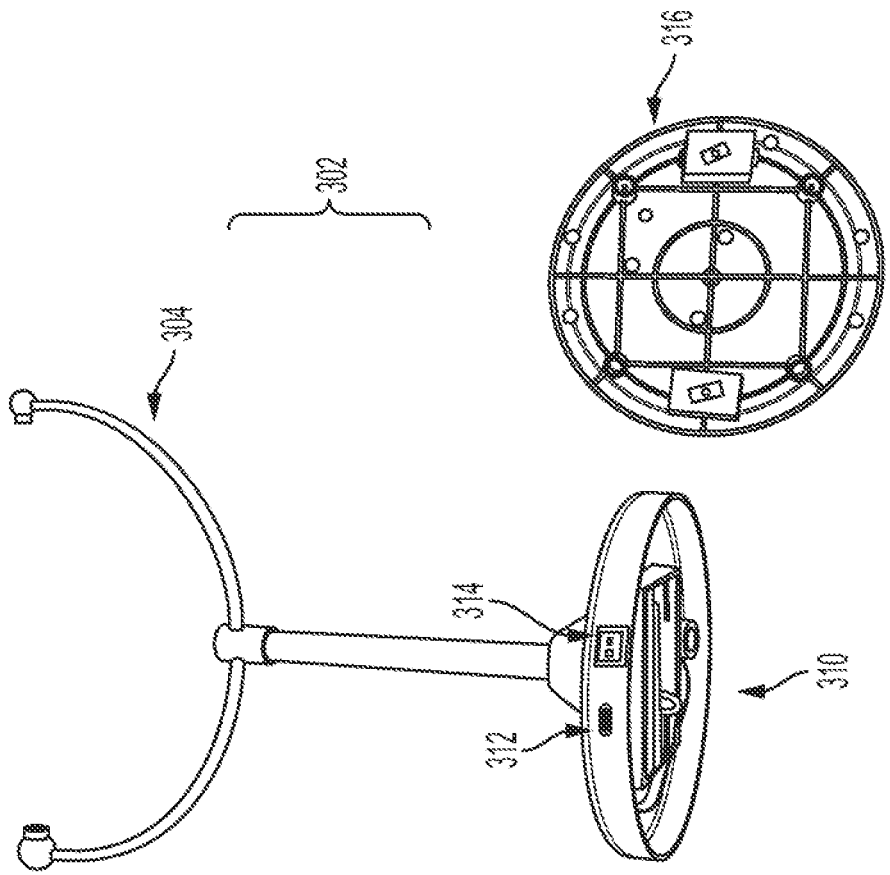
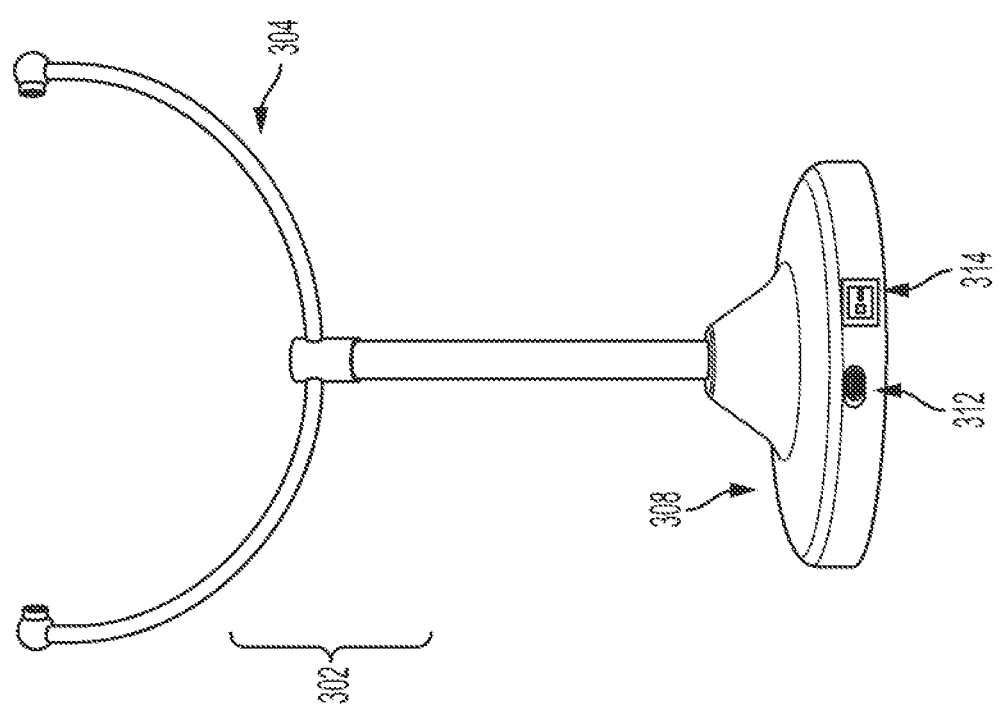

MIRROR WITH LIGHT EMITTING ELEMENTS AND STAND

CROSS-REFERENCE TO RELATED APPLICATIONS

The present application claims priority to U.S. Provisional Application Ser. No. 63/049,381, titled "MIRROR WITH LIGHT EMITTING ELEMENTS AND STAND," filed Jul. 8, 2020, the contents of which are incorporated herein by reference in their entirety.

BACKGROUND

Light emitting devices may comprise light emitting diodes as the light source. Light emitting diodes (also referred to herein as LEDs) are semiconductor devices that emit light when an electric current is passed through them. The light is produced when particles that carry the electric current (e.g., electrons and holes) combine together with the semiconductor material of the semiconductor devices. LEDs are described as solid-state devices, which distinguishes them from other lighting technologies that use heated filaments or gas discharge as lighting sources (e.g., incandescent, tungsten halogen lamps; fluorescent lamps). For lighting applications, LED die are typically incorporated in packages that provide reflector structure, electric connections, thermal connections, and light conversion phosphor.

Conventional LED lighted mirrors are deficient in that they provide poor light output, poor light distribution, poor thermal management, and limited light quality flexibility. Through applied effort, ingenuity, and innovation many deficiencies of such systems have been solved by developing solutions that are in accordance with the embodiments of the present invention, many examples of which are described in detail herein.

SUMMARY

Embodiments are directed to a lighted mirror apparatus employing LEDs as the light source. The apparatus comprises a reflective module. The reflective module comprises a first reflective module face. The first reflective module face comprises a first reflective module surface defining a first reflective module surface periphery and spanning less than the entirety of the first reflective module face. The mirror apparatus further comprises a reflective module interior. The reflective module interior of embodiments defines a void configured to house a plurality of LED packages therein. The mirror apparatus further comprises a reflective module exterior. The mirror apparatus further comprises a flexible circuit board disposed within the reflective module interior. The flexible circuit board of embodiments has a first side and a second side. The mirror apparatus further comprises a plurality of LED packages disposed on and/or electrically contact to a first side of the flexible circuit board. The plurality of LED packages are positioned outside the first reflective module surface periphery and the LED packages are configured to emit light to illuminate the first reflective module surface.

In one possible embodiment, the mirror apparatus further comprises a LED diffuser.

The flexible circuit board of the mirror apparatus further comprises a plurality of LED packages disposed on and/or electrically and mechanically connected to the first side of the flexible circuit board. A plurality of leads or traces are disposed on the first or second side of the flexible circuit board and electrically connected to the plurality of LED packages. LED driver circuitry is disposed in the housing and electrically connected with the electrical traces on the flexible circuit board.

In certain embodiments, the plurality of LED packages comprise LED packages of differing optical qualities such as brightness, color temperature, and or CRI. Further, in certain embodiments, the driver circuitry is configured to control brightness, color temperature, and/or CRI of the LED packages.

In certain embodiments, the mirror apparatus further comprises a reflective module base. The reflective module base of certain embodiments comprises a reflective module coupling arm, the reflective module coupling arm being mechanically couplable to the reflective module so as to provide free-standing support. In certain embodiments, a reflective module base comprises a reflective module base interior. The reflective module base interior of certain embodiments defines a void and is configured to house reflective module power components therein. In certain embodiments, the reflective module base comprises a reflective module base exterior. In certain embodiments, a reflective module base comprises a reflective module base charging port. The reflective module base charging port of certain embodiments is in electrical communication with the reflective module power components and is configured to be mechanically and/or electrically coupled to an electrical outlet in order to charge the reflective module power components. In certain embodiments, a reflective module base comprises a reflective module power switch. The reflective module power switch of certain embodiments is in electrical communication with the reflective module power components and is configured to initiate and/or cease power delivery to the mirror apparatus.

In certain embodiments, the flexible circuit board of a mirror apparatus is thermally conductive.

In certain embodiments, the flexible circuit board of a mirror apparatus is in thermal communication with the reflective module exterior so that heat generated during operation of the mirror apparatus is conducted to the reflective module exterior.

In certain embodiments, the first reflective module face of the mirror apparatus comprises a first reflective module surface. The first reflective module surface of certain embodiments defines a first reflective module surface periphery and spans less than an entirety of the first reflective module face.

In certain embodiments, the reflective module interior of the mirror apparatus defines a void. The void of certain embodiments is configured to house the plurality of LED packages therein.

In certain embodiments, the reflective module interior of the mirror apparatus defines a void to house the LED driver circuity, battery, and other electronics associated with the mirror apparatus.

In certain embodiments, the reflective module face of the mirror apparatus is configured to provide peripheral lighting to a user of the mirror apparatus.

In certain embodiments, the reflective module of the mirror apparatus comprises a first reflective module face and a second reflective module face.

In certain embodiments, the first reflective module face of the mirror apparatus comprises a circularly shaped, concave magnifying mirror.

In certain embodiments, the second reflective module face of the mirror apparatus comprises a circularly shaped, flat mirror.

In certain embodiments, one or more of the first reflective module face or the second reflective module face comprises a first layer of reflective material. The first layer of a reflective material of certain embodiments overlays a second composite layer. The second composite layer of certain embodiments comprises a junction of a mirrored area and a frosted area.

In certain embodiments, the frosted area sits atop the mirrored area.

In certain embodiments, the mirrored area comprises a metal layer coating of one or more of gold, silver, aluminum or chrome.

In certain embodiments, the frosted area comprises a translucent substrate capable transmitting light.

In certain embodiments, a frame encases the reflective module face.

In certain embodiments, the frame comprises an inverted U-shape.

In certain embodiments, one or more spacers is positioned between an outer edge of one or more of the first reflective module face or the second reflective module face and the frame.

In certain embodiments, the one or more spacers are configured to prevent edge lighting.

In certain embodiments, the mirror apparatus further comprises a first frame recess between an edge of the flexible circuit board and an edge of the circularly shaped, flat mirror.

In certain embodiments, the first frame recess has a width of approximately 4-5 mm.

In certain embodiments, the flexible circuit board defines a chamfer. The chamfer of certain embodiments secures a position of the circularly shaped, concave magnifying mirror.

In certain embodiments, the chamfer defines a slope of the flexible circuit board.

In certain embodiments, the mirror apparatus further comprises a foam cushion. The foam cushion of certain embodiments is positioned between the first reflective module face and the second reflective module face.

In certain embodiments, the mirror apparatus further comprises a distance of approximately 8 mm or 9 mm between the chamfer of the flexible circuit board and edges of the circularly shaped, magnifying mirror.

This Summary does not attempt to completely signify any particular innovation, embodiment, or example as it can be used in commerce. Additionally, this Summary is not intended to signify essential elements of an innovation, embodiment or example or to limit the scope of the subject matter of this disclosure.

The innovations, embodiments, and/or examples found within this disclosure are not all-inclusive, but rather describe the basic significance of the subject matter. Accordingly, one use of this Summary is as a prelude to a Detailed Description presented later.

BRIEF DESCRIPTION OF THE DRAWINGS

The following Detailed Description, Figures, and appended Claims signify the nature and advantages of the innovations, embodiments and/or examples of the claimed inventions. All of the Figures signify innovations, embodiments, and/or examples of the claimed inventions for purposes of illustration only and do not limit the scope of the claimed inventions. Such Figures are not necessarily drawn to scale and are part of the Disclosure.

In the Figures, similar components or features may have the same, or similar, reference signs in the form of labels (such as alphanumeric symbols, e.g., reference numerals), and may signify similar or equivalent functionality. Further, various components of the same type may be distinguished by following the reference label by a dash and a second label that distinguishes among the similar components. If only the first reference label is used in the specification, the description is applicable to any one of the similar components having the same first reference label irrespective of the second reference label. A brief description of the Figures is below.

FIG. 2A illustrates an exemplary mirror frame assembly of an exemplary mirror apparatus according to various embodiments;

FIG. 2B illustrates an exemplary mirror frame assembly of an exemplary mirror apparatus, with parts removed to show internal structure, according to various embodiments;

FIG. 5E is a back view an exemplary of reflective module base of an exemplary mirror apparatus according to various embodiments;

FIG. 5F is a perspective view of an exemplary reflective module base of an exemplary mirror apparatus according to various embodiments;

DETAILED DESCRIPTION

Figure 1A:
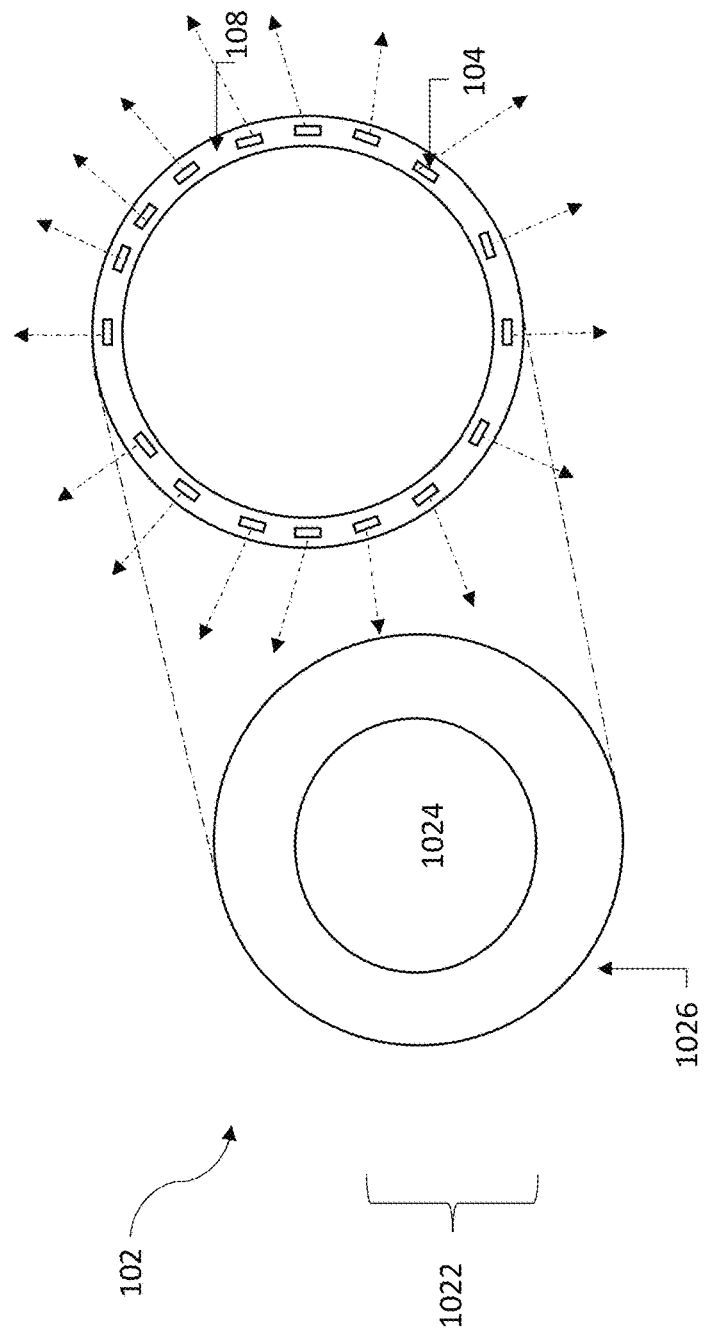
FIG. 1A is a perspective view of an exemplary reflective module, separated from a remainder of an exemplary mirror apparatus, according to various embodiments.

The present disclosure more fully describes various embodiments with reference to the accompanying drawings. It should be understood that some, but not all embodiments are shown and described herein. Indeed, the embodiments may take many different forms, and accordingly this disclosure should not be construed as limited to the embodiments set forth herein. Rather, these embodiments are provided so that this disclosure will satisfy applicable legal requirements. Like numbers refer to like elements throughout.

It is an objective of the present disclosure to provide better light output, light distribution, light quality options, and thermal management over conventional systems.

Conventional lighted mirrors using LEDs as the light source where the LED packages are mounted around the periphery of a central core are limited in the number of LED packages that may be employed and conventional lighted mirrors using LEDs as the light source where the LED packages are mounted with their primary light emission direction facing out toward the user are also limited in the number of LED packages that may be employed. When an insufficient or limited number of LED packages is employed, the resultant light is brighter nearer to the LED package locations and darker in the areas between LED packages. This results in pixilation of the light produced by the LED packages, and therefore poor illumination of the mirror surface. The present disclosure solves this deficiency regarding light pixilation by overcoming the quantity limitation on the number of LED packages that may be employed. To this end, the present disclosure employs a flexible circuit board bearing the LED packages mounted about the longer inside periphery of the frame, thereby allowing sufficiently more LED packages to be employed than in conventional systems.

Moreover, an increase in the number of LED packages that may be employed is advantageous to overcome other light quality limitations of conventional systems. For example, there is a need to provide illumination of optimal color temperature to achieve a desirable lighting environment for completing a task, or for a preferred living ambiance. Embodiments of the present disclosure enabling an increase in the number of LED packages allow for combinations of LED packages with differing optical characteristics without trading off limited light output. As a non-limiting illustration, the LED packages may comprise a first set of sixty 2700K LED packages and a second set of sixty 3300K LED packages. A user may select a color temperature of 2700K or a color temperature of 3000K or anything in between. For example, a desired color temperature of 3000K may therefore be produced by driving the first set at 50% and the second set at 50%. The color temperature variance may be achieved without diminished lumen output unless dimming is also desired. There is also a need to provide illumination in a mirror apparatus that adequately captures the true color of reflected objects. The LED packages may therefore comprise LED packages of differing color rendering index (CRI). For example, the LED packages of differing CRI may result in achieving a preferred total CRI of 90. Therefore, the present disclosure overcomes the light quality limitations of conventional systems by combining LED packages of differing color temperature, CRI and brightness in order to provide light quality options.

The LED packages may also be arranged in various configurations. For example, the LED packages may be arranged according to color temperature (e.g., where the placement of an LED package is dependent on its color temperature as compared to its nearest neighbors). To return to the above example, the first set of sixty 2700K LED packages and the second set of sixty 3300K LED packages may be arranged by alternating 2700K and 3300K LED packages according to color temperature.

It will be appreciated that various other optical characteristics may be achieved by these and other combinations of LED packages taught by the present disclosure.

Further, the present disclosure may provide better thermal management over conventional lighted mirrors. For example, use of a flexible circuit board as disclosed herein may facilitate a shorter thermal route for the heat generated during operation than conventional systems. The mirror frame is a short thermal path to ambient air, where heat may be dissipated. Optimal thermal conductivity may be achieved when a circuit board can mimic the inside curvature of a mirror frame. A flexible circuit board is conducive to mimic the inside curvature of a mirror frame, as disclosed herein. A flexible circuit board mimics the inside curvature of a mirror frame by lying flat and clinging tightly to the mirror frame. Further, a flexible circuit board as disclosed herein is inexpensive and easy to install. For example, a flexible circuit board may be installed using an inexpensive adhesive or an inexpensive adhesive tape. Mounting a flexible circuit board directly to the inside of the mirror frame, as disclosed herein, therefore achieves better thermal management over conventional lighted mirrors.

Further still, conventional systems configure the mirror glass to extend all the way to the inside of the mirror frame. As a result, light output and light distribution in conventional systems is limited to exiting through the plate surface. The present invention overcomes this deficiency by configuring the mirror surface such that it does not extend all the way within the mirror frame, and by configuring the constituent LED packages outside the peripheral edge of the mirror surface. This causes the mirror surface to act as a light guide for light entering the mirror surface at its edge. As a result, illumination across the mirror and the illumination area is smoothed. Alternatively, spacers may be employed between the mirror frame and mirror surface when edge lighting is not desired, or fitment requires such spacing.

Figure 1B:
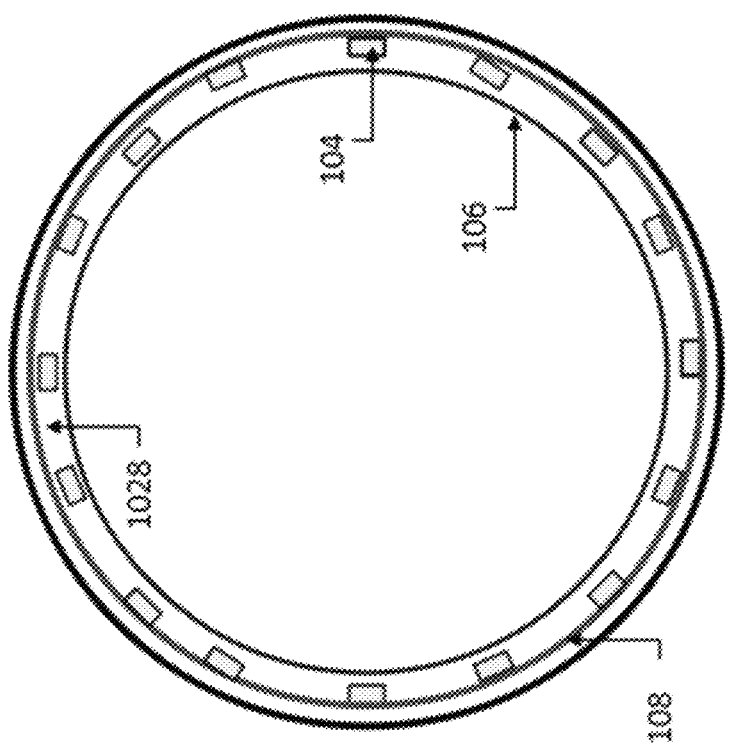
FIG. 1B is a front view of an exemplary reflective module of the inside of an exemplary mirror apparatus according to various embodiments.

FIGS. 1A-1B illustrate an exemplary reflective module 102 for use with an exemplary mirror apparatus configured in accordance with embodiments of the present disclosure. The dashed lines originating from the first module face 1022 indicate that reflective module 102 is seen separated from the remainder of the mirror apparatus. In embodiments, an exemplary reflective module 102 comprises a flexible circuit board 108. In embodiments, the flexible circuit board 108 may be housed within a reflective module interior 1028. The flexible circuit board 108 may comprise a plurality of LED packages 104. The dashed lines originating from the LED packages indicate the direction of light emission therefrom. In embodiments, the flexible circuit board 108 may define the circumference of the reflective module 102 (e.g., which is circular in embodiments).

A first reflective module surface 1024 may comprise any material suitable to achieve an appropriate level of visual reflection for activities such as putting on makeup, shaving, or any other general grooming activities or activities requiring reflection. For example, the first reflective module surface 1024 may therefore comprise materials including, but not limited to, glass (having been appropriately polished and treated with a reflective coating. The first reflective module surface 1024 may span less than an entirety of a first reflective module face 1022 so as to define a first reflective module surface periphery 1026.

In embodiments, the reflective module 102 may comprise a LED diffuser 106 comprising materials suitable to diffuse the light emitted by the LED packages including, but not limited to, acrylic, polycarbonate, plastic, paper, and/or the like.

Figure 1D:
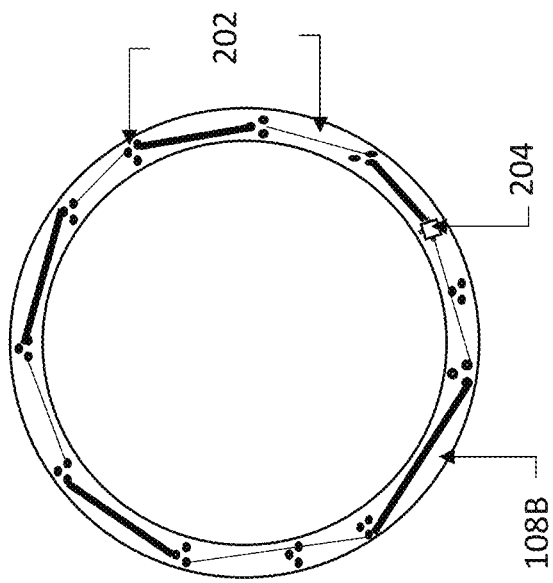
FIG. 1D is a back view of an exemplary flexible circuit board of an exemplary mirror apparatus according to various embodiments.
Figure 1C:
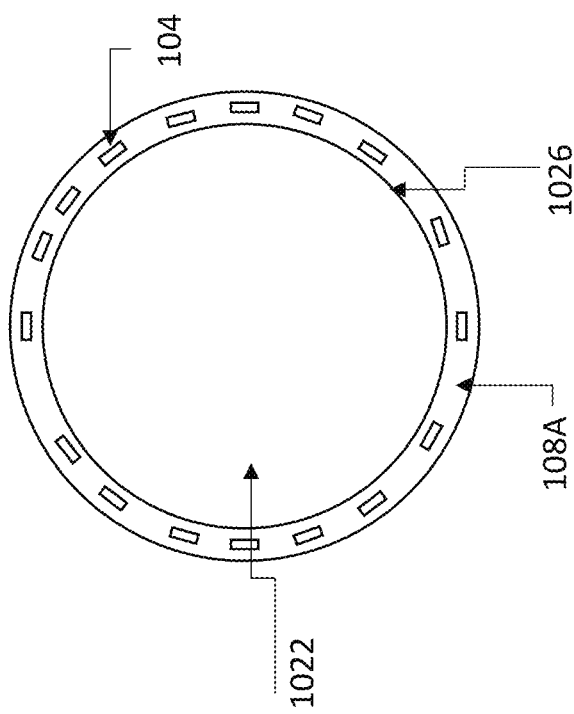
FIG. 1C is a front view of an exemplary flexible circuit board of an exemplary mirror apparatus according to various embodiments.
Figure 2D:
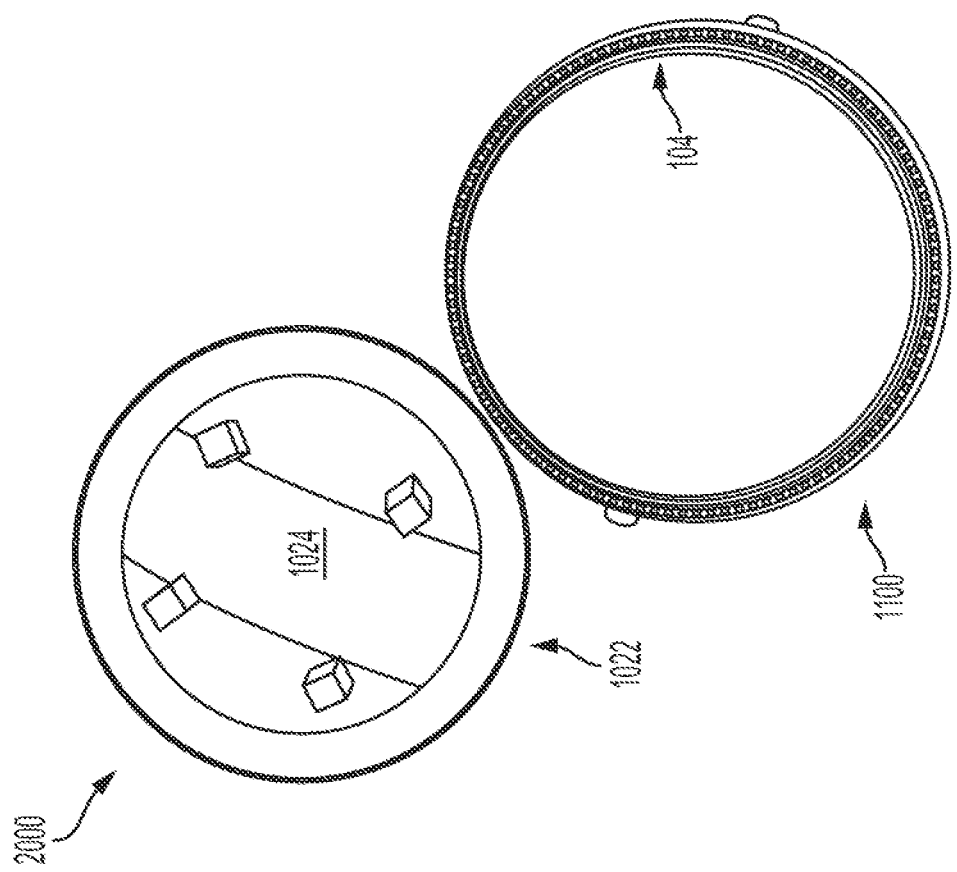
FIG. 2D illustrates an exemplary mirror frame assembly of an exemplary mirror apparatus according to various embodiments.
Figure 2C:
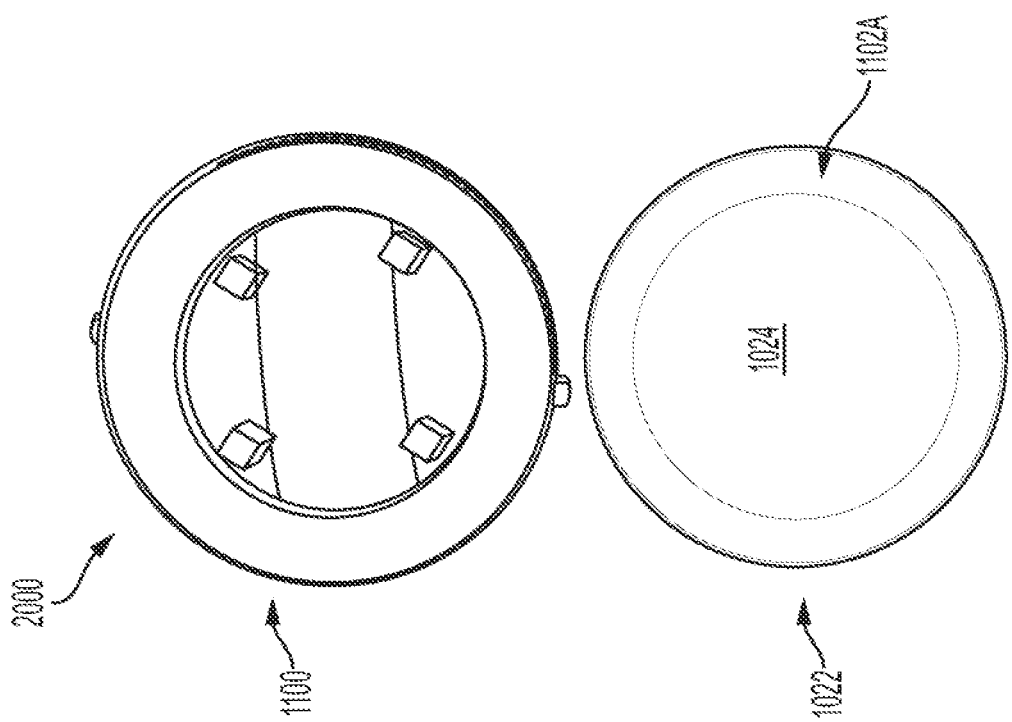
FIG. 2C illustrates an exemplary mirror frame assembly of an exemplary mirror apparatus, with parts removed to show internal structure, according to various embodiments.
Figure 2F:
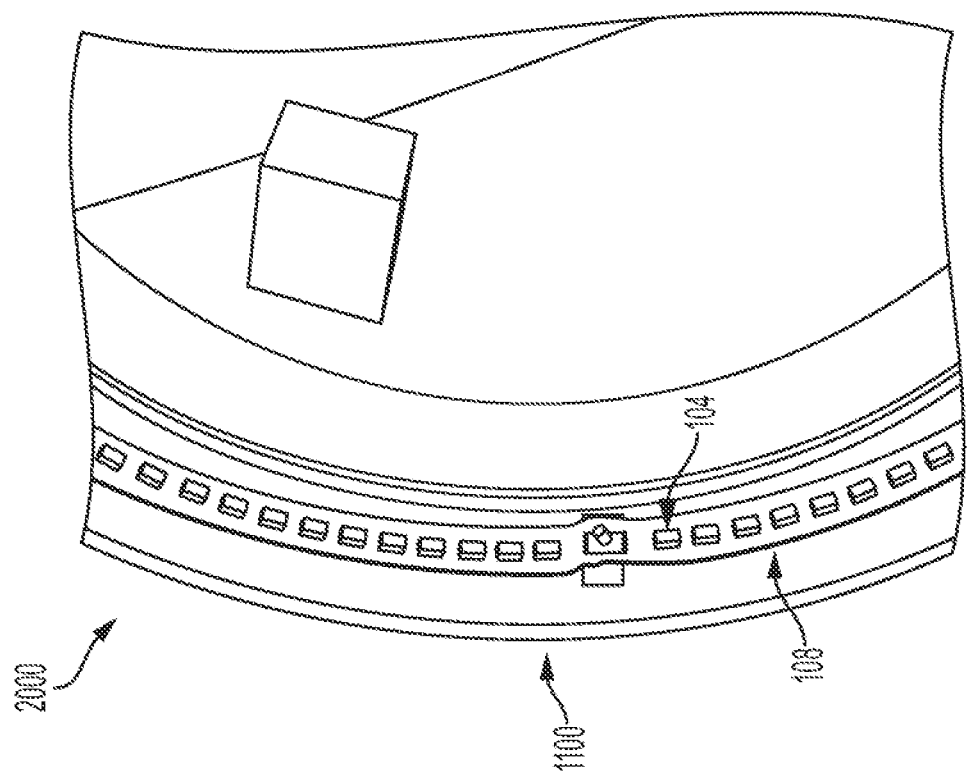
FIG. 2F illustrates an exemplary mirror frame assembly of an exemplary mirror apparatus according to various embodiments.
Figure 2E:
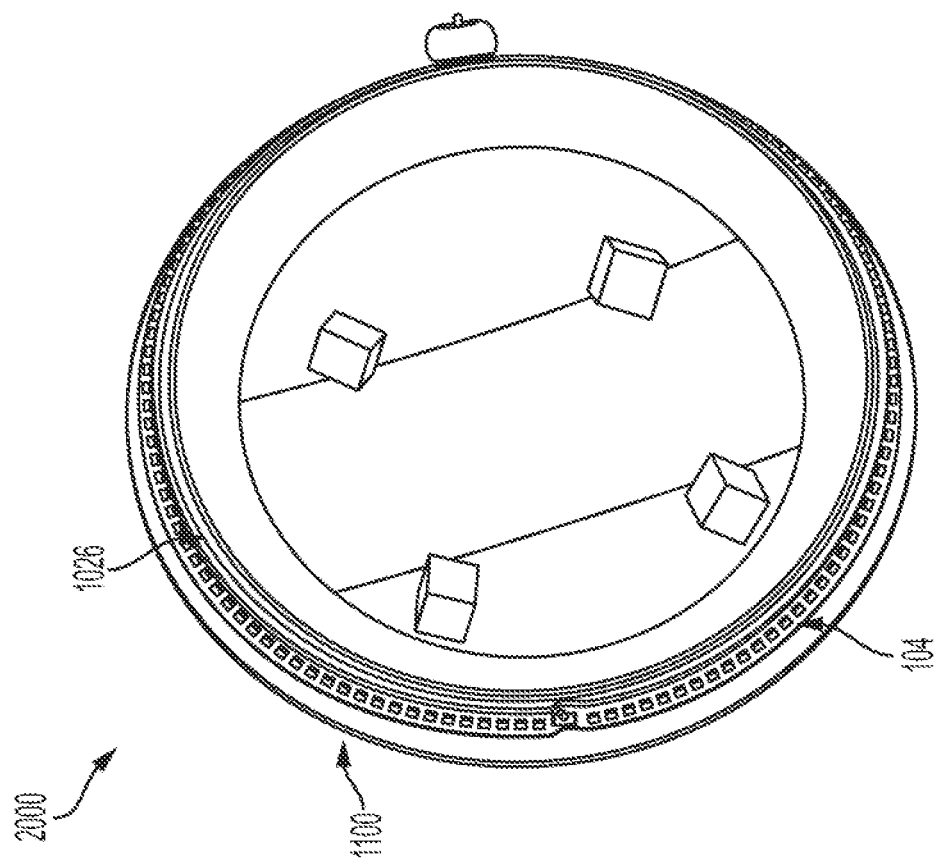
FIG. 2E illustrates an exemplary mirror frame assembly of an exemplary mirror apparatus according to various embodiments.
Figure 2H:
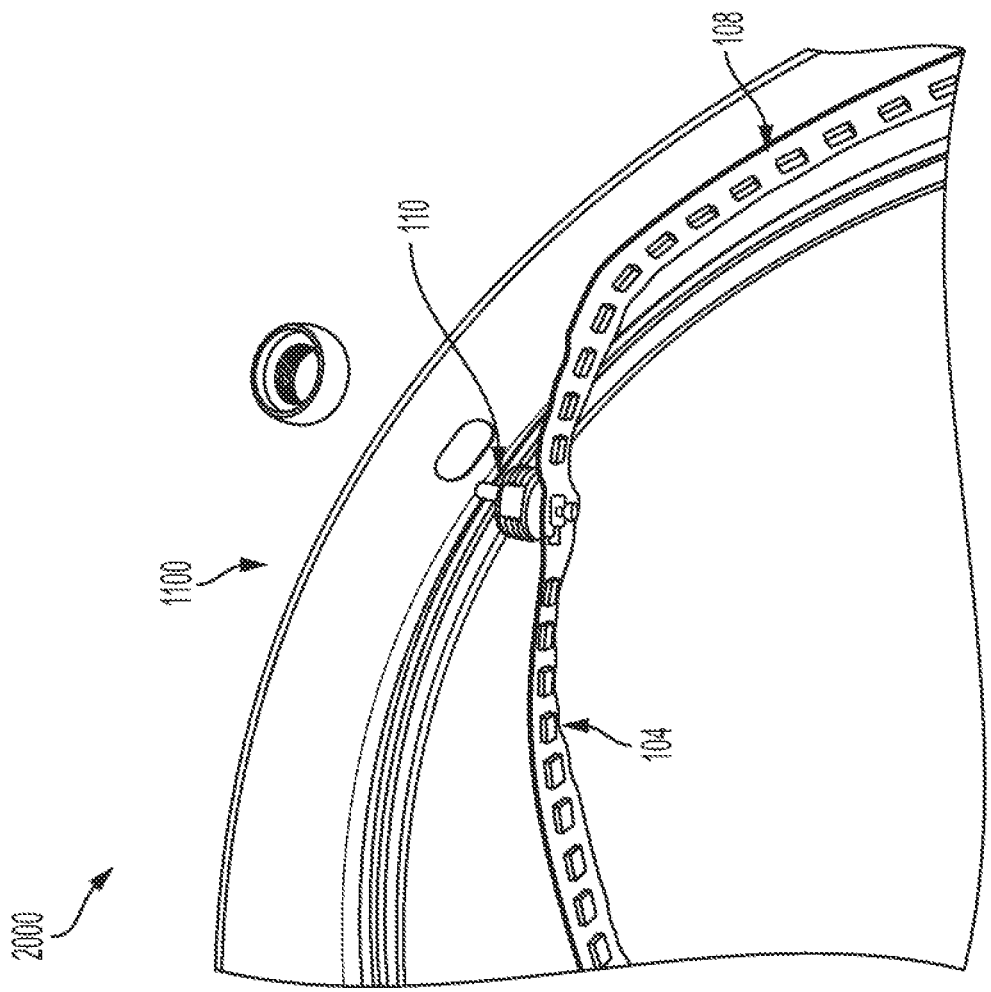
FIG. 2H illustrates an exemplary mirror frame assembly of an exemplary mirror apparatus according to various embodiments.
Figure 2G:
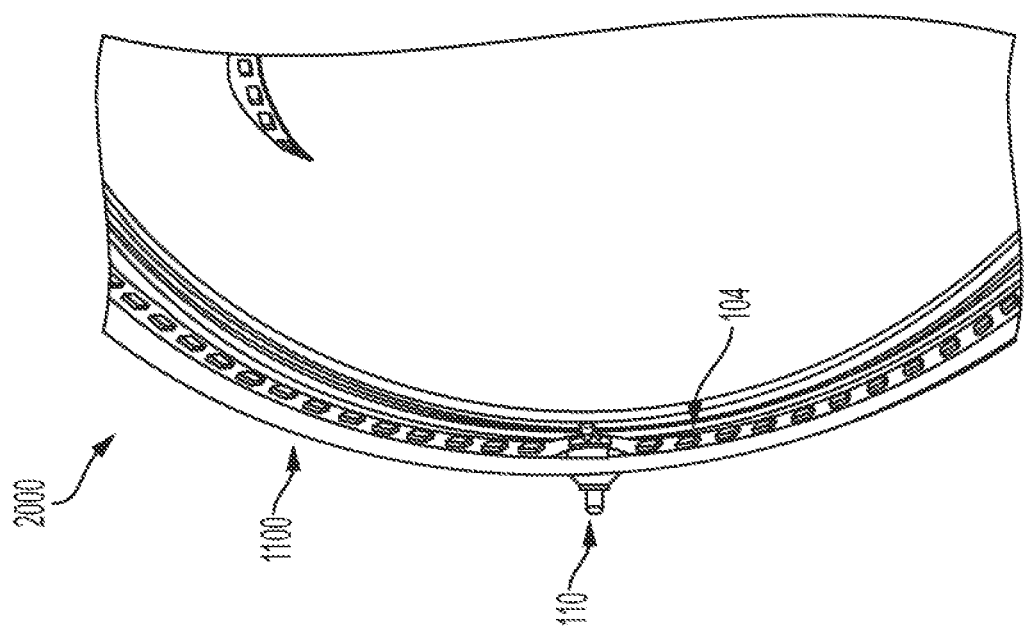
FIG. 2G illustrates an exemplary mirror frame assembly of an exemplary mirror apparatus according to various embodiments.
Figure 2J:
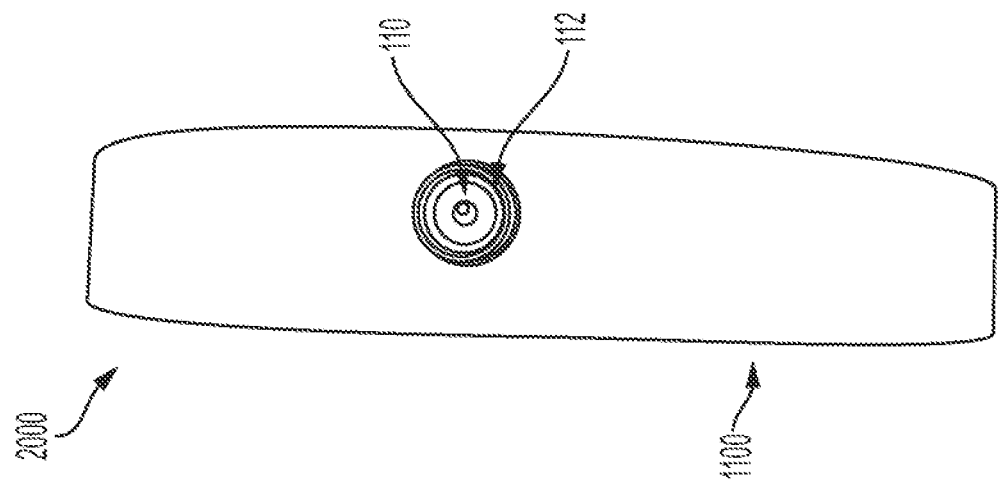
FIG. 2J illustrates an exemplary mirror frame assembly of an exemplary mirror apparatus according to various embodiments.
Figure 2I:
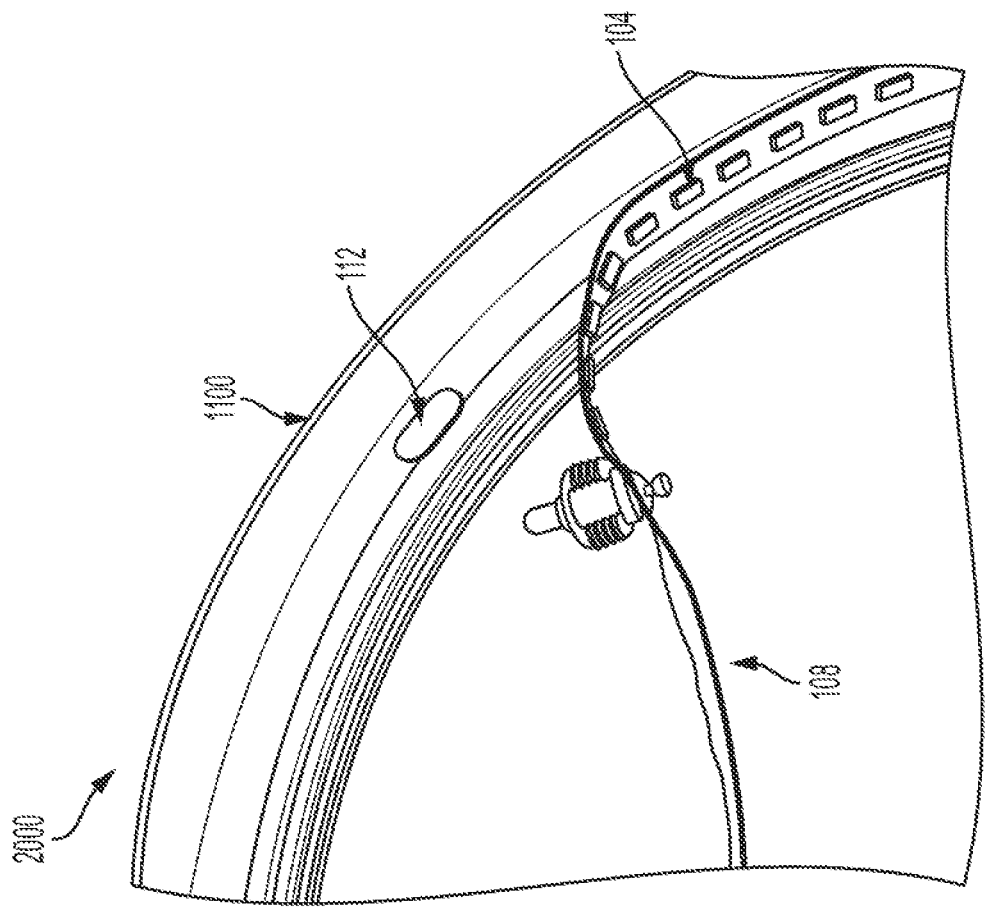
FIG. 2I illustrates an exemplary mirror frame assembly of an exemplary mirror apparatus according to various embodiments.

FIGS. 1C-1D illustrate a first side 108A and a second side 108B of a flexible circuit board 108 of an exemplary mirror apparatus, according to embodiments of the present disclosure. A plurality of reflective module LED packages 104 may be disposed on and electrically connected to a first side 108A of the flexible circuit board 108. The reflective module LED packages 104 may be one or more of discrete over molded packaged LEDs or surface mount LED packages. Alternatively, the reflective module LED packages 104 may be configured in a chip on board (CoB) arrangement, whereby the reflective module LED packages 104 are mounted directly to the flexible circuit board 108. However, a preferred embodiment may employ reflective module LED packages 104 having more robust manufacturing characteristics. For example, mid-power 3030 LED packages are easier to handle, and readily comprise phosphor conversion material within. In embodiments, white light may be the preferred light color to be used. The reflective module LED packages 104 may comprise LED packages of differing optical qualities including, but not limited to, brightness, color temperature, and CRI. The plurality of reflective module LED packages 104 may be positioned outside a first reflective module surface periphery 1026 and may be configured to emit light to illuminate a first reflective module surface 1022.

In embodiments, the flexible circuit board 108 may comprise driver circuitry 204 for controlling emission of light using the reflective module LED packages. In embodiments, the driver circuitry 204 as well as circuit traces/leads 202 may be disposed on a second side 108B of the flexible circuit board 108.

FIGS. 2A-2J illustrate an exemplary mirror frame assembly 2000 of an exemplary mirror apparatus according to embodiments of the present disclosure. In configurations of an exemplary mirror frame assembly, a mirror frame 1100 may define the circumference of the reflective module 102 (e.g., which is circular in embodiments) such that there is sufficient diameter to encase a reflective module face 1022, reflective module surface 1024 and accompanying frosted area 1102A. Reflective module LED packages 104 may be configured outside the periphery 1026 of the reflective module face 1022.

FIGS. 2F-2J illustrate exemplary attachment of a flexible circuit board 108 comprising a plurality of reflective module LED packages 104 to an exemplary mirror frame assembly according to embodiments of the present disclosure. In embodiments, attachment or fastening means 110 (e.g., a suitable screw or the like, designed to withstand operational temperatures) attaches the flexible circuit board 108 to the mirror frame 1100 through an attachment opening 112 (e.g., a bore).

Figure 3A:
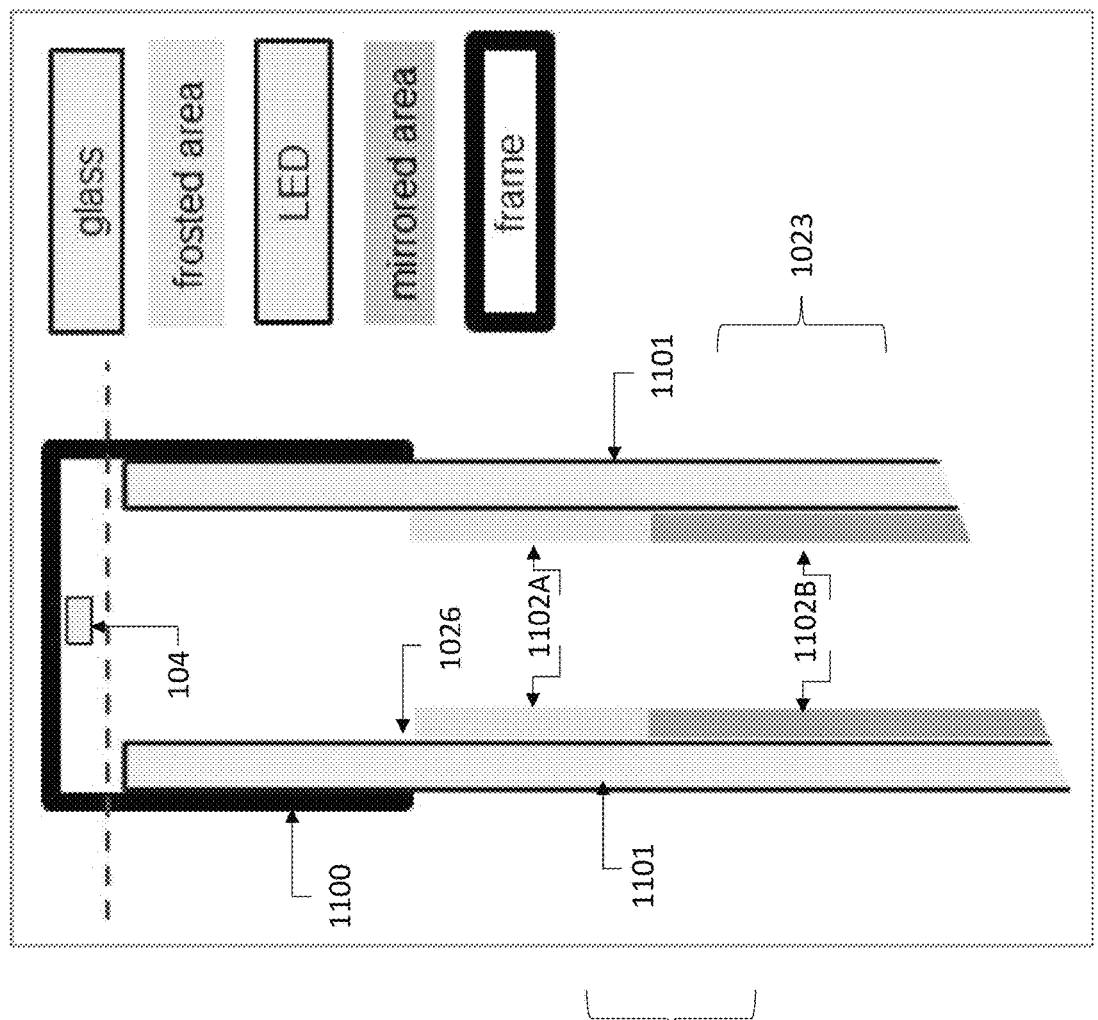
FIG. 3A is a cross-section of an exemplary reflective module according to various embodiments.

FIG. 3A illustrates an exemplary reflective module 102 for use with embodiments of the present disclosure. In embodiments, a reflective module face 1022 may be configured to provide edge lighting. A first reflective module face 1022 and a second reflective module face 1023 may respectively comprise a circularly shaped, concave magnifying mirror and a circularly shaped, flat (e.g., non-magnifying) mirror, although any combination of mirror magnifications may be used depending on the desired effect. Alternate magnification may then accompany reflection for grooming tasks upon selection of an appropriate reflective module surface. The flat and magnifying mirrors may each comprise a first layer of glass 1101, or other material suitable as a reflective surface, overlaying a second, composite layer 1102A, 1102B. The second, composite layer 1102A, 1102B may comprise a junction of a mirrored area 1102B and a frosted area 1102A. The second, composite layer 1102A, 1102B may be configured so that the frosted area 1102A sits atop the mirrored area 1102B.

Each mirrored area 1102B may comprise suitable materials to impart reflective quality to glass or another substrate. For example, each mirrored area 1102B may comprise a metal layer coating of e.g., gold, silver, aluminum, or chrome. Each frosted area 1102A may comprise a substrate such as glass or other material having undergone suitable treatment to render the substrate translucent, and capable of blurring images while yet transmitting light.

In certain embodiments, each first layer 1101 may span a first length in a plane transverse to the respective circumference of each mirrored area 1102B. The second, composite layer 1102A, 1102B may span a second, lesser distance in a plane transverse to the circumference of each mirrored area 1102B such that the second, composite layer 1102A, 1102B is offset relative to the first layer 1101. Therefore, when viewed from the front perspective of, for example, FIGS. 4A-4B, the mirrored areas 1102B of both the flat and the magnifying mirror may define a first reflective module surface 1024 and a second reflective module surfaces 1025, respectively, as smaller, circular areas concentric with larger circular areas. The larger circular areas may define a first reflective module face 1022 and a second reflective module face 1023.

A frame 1100 of suitable material, such as metal, plastic, ceramic, or the like may encase the first reflective module face 1022, the second reflective module face 1023, and the reflective module LED packages 104. When viewed from a front perspective, the frame 1100 may define the circumference of a yet larger circle, concentric with the concentric circles defined by the first reflective module surface 1024 and first reflective module face 1022. When viewed in the cross-section of FIG. 3A, the frame 1100 may define a profile that is substantially an inverted U-shape. The frame side walls of the inverted U-shaped frame 1100 may extend a first length along the first layers 1101 of the flat and magnifying mirrors. However, the inverted U-shaped frame 1100 may be configured so as to define a first recess between the frame base of the inverted U-shaped frame 1100 and the first layers 1101 of the flat and magnifying mirrors. The reflective module LED packages 104 may be disposed within the frame 1100 to be configured outside the periphery of the mirror surface 1026. A second recess between the inverted U-shaped frame 1100 and the second, composite layers 1102A, 1102B of the flat and magnifying mirrors may subsequently be defined. Nonetheless, with the first recess, the frame 1100 may define a boundary limiting the extension, within the frame 1100, of the first layers 1101 of the first reflective module face 1022 and second reflective module face 1023.

Figure 3B:
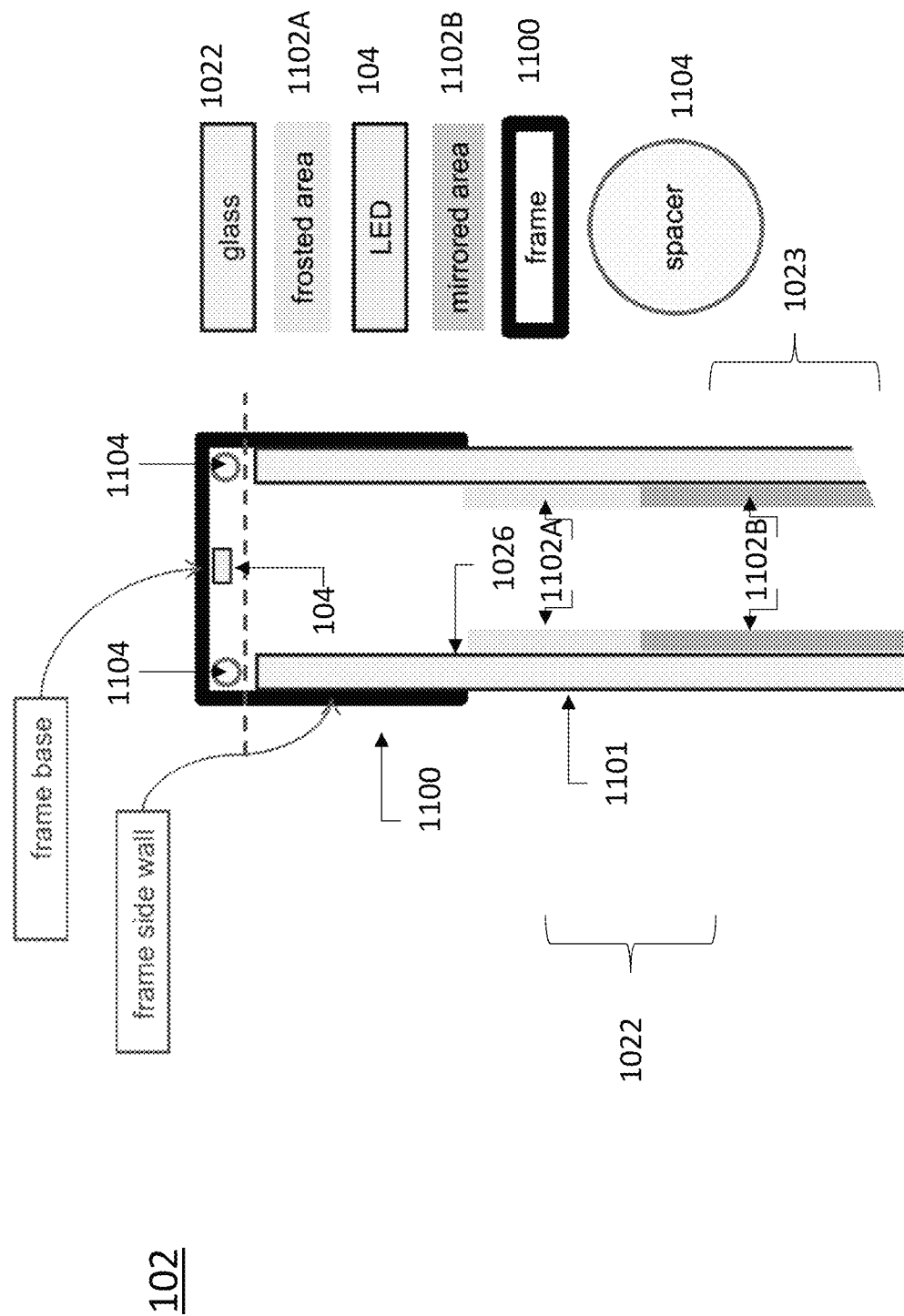
FIG. 3B is a cross-section of an exemplary reflective module according to various embodiments.

FIG. 3B illustrates an exemplary reflective module 102 for use with embodiments of the present disclosure. In embodiments, a first reflective module face 1022 and a second reflective module face 1023 may be configured to provide no edge lighting. A first reflective module face 1022 and a second reflective module face 1023 may respectively comprise a circularly shaped, concave magnifying mirror and a circularly shaped, flat mirror. The flat and magnifying mirrors may each comprise a first layer of glass 1101, or other material suitable as a reflective surface, overlaying a second, composite layer 1102A, 1102B. The second, composite layer 1102A, 1102B may comprise a junction of a mirrored area (1102B) and a frosted area (1102A).

When viewed in the cross-section of FIG. 3B, the second, composite layer 1102A, 1102B may be configured so that the frosted area 1102A sits atop the mirrored area 1102B. Each mirrored area 1102B may comprise suitable materials to impart reflective quality to glass or another substrate. For example, each mirrored area 1102B may comprise a metal layer coating of e.g., gold, silver, aluminum, or chrome. Each frosted area 1102A may comprise a substrate such as glass or other material having undergone suitable treatment to render the substrate translucent, and capable of blurring images while yet transmitting light.

When viewed in the cross-section of FIG. 3B, each first layer 1101 may span a first length in a plane transverse to the respective circumference of each mirror. The second, composite layer 1102A, 1102B may span a second, lesser distance in a plane transverse to the circumference of each mirror such that the second, composite layer 1102A, 1102B is offset relative to the first layer 1101. Therefore, when viewed from the front perspective of FIG. 4A below, the magnifying mirror may define a reflective module surface 1024 as a smaller, circular area concentric within a larger circular area. The larger circular area may define a reflective module face 1022. The flat mirror may likewise define a reflective module surface 1025 as a smaller, circular area concentric within a larger circular area. The larger circular areas may then define a reflective module face 1023.

A frame 1100 of suitable material, such as metal, plastic, ceramic, or the like may encase the first 1022 and second 1023 reflective module faces, and reflective module LED packages 104. When viewed in the cross-section of FIG. 3B, the frame 1100 may define a profile that is substantially an inverted U-shape. The frame side walls of the inverted U-shaped frame 1100 may extend a first length along the first layers 1101 of the flat and magnifying mirrors. However, the inverted U-shaped frame 1100 may be configured so as to define a first recess between the frame base of the inverted U-shaped frame 1100 and the first layers 1101 of the flat and magnifying mirrors. The reflective module LED packages 104 may be configured outside the periphery 1026 of the reflective module surface. A second recess between the inverted U-shaped frame 1100 and the second, composite layers 1102A, 1102B of the flat and magnifying mirrors may subsequently be defined. Nonetheless, therewith the first recess, the frame 1100 may define a boundary limiting the extension of the first layer 1101 of a first 1022 or second 1023 reflective module face into the frame 1100.

Spacers 1104 may be disposed within the frame 1100 to prevent edge lighting. Spacers 1104 may be configured of any shape or material. Suitable spacers 1104 may be configured having a thickness greater than the combined thickness of the flexible circuit board 108 and reflective module LED packages 104. Thus configured, the spacers 1104 may ensure both that a recess is defined between the reflective module LED packages 104 and first reflective module face 1022, and fill space between the inside of the frame base 1100 and the edge of the reflective module face 1022.

Figure 4A:
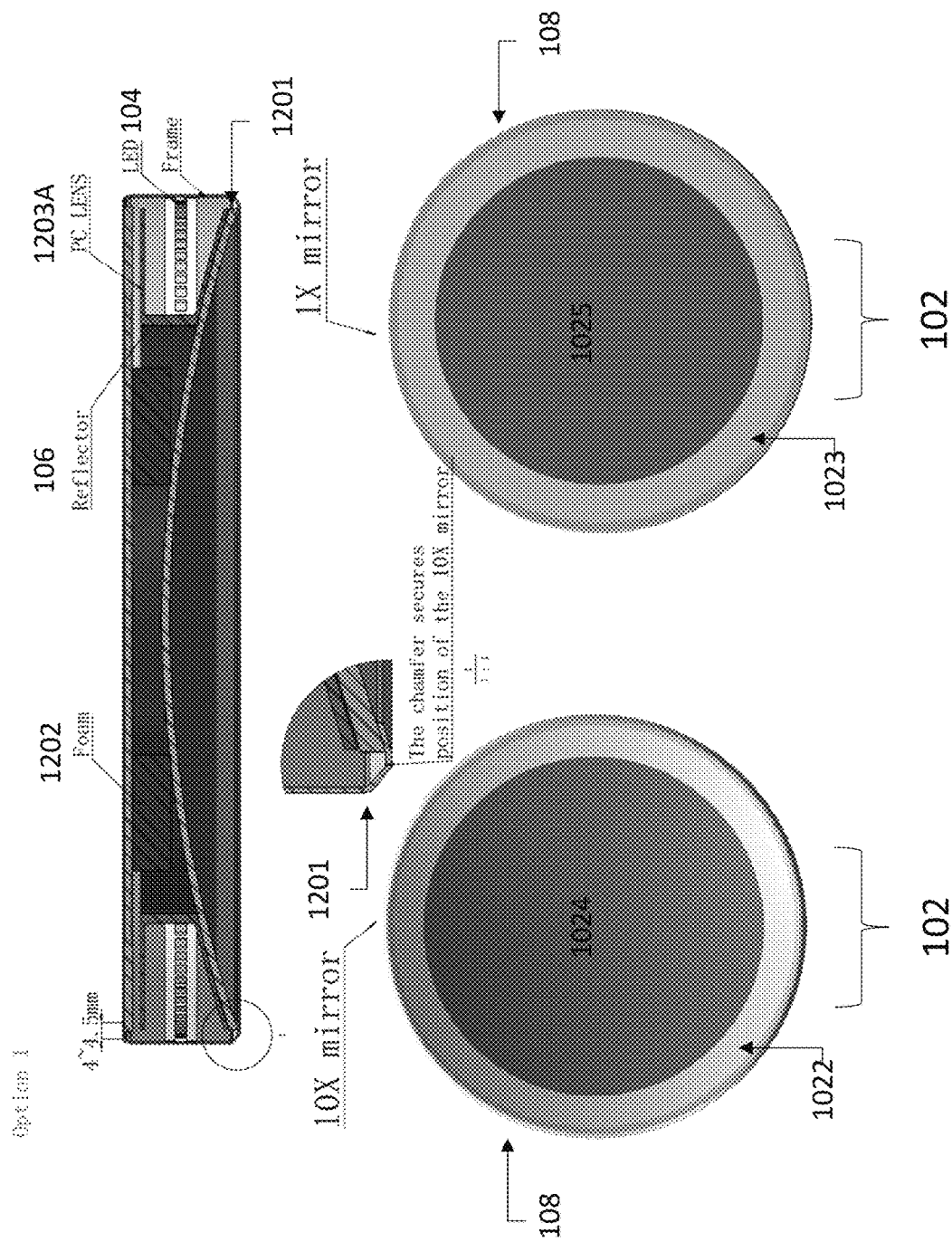
FIG. 4A is a cross-section of an exemplary mirror apparatus according to various embodiments.

FIG. 4A illustrates an exemplary reflective module interior 1028 configured to achieve improved light output and light distribution over conventional apparatuses. In embodiments, a flexible circuit board 108 having a length, width and thickness may be disposed in the first frame recess as described above. A small distance, for example, approximately 4-4.5 mm may define a recess between the edge of the flexible circuit board 108 and the edges of the flat mirror. The flexible circuit board 108 may define the circumference of a circle bounding the first 1022 and second 1023 reflective module faces as shown in the front perspective of FIG. 4A. The flexible circuit board 108 may be further configured such that it defines a chamfer 1201 that secures the position of the magnifying mirror.

As shown in the cross-section of FIG. 4A, a plurality of reflective module LED packages 104 may be configured in a first posture. Thus, the plurality of reflective module LED packages 104 may be configured such that they span the length of the flexible circuit board 108, and such that they are relatively aligned on a medial axis of the flexible circuit board 108. A foam cushion 1202 may be configured between the two mirrors for support such that the foam cushion 1202 spans a length less than the diameter of the two circular mirrors. Substantially U-shaped PC lenses 1203A may flank the foam cushion, sitting in a plane parallel to the length of the flexible circuit board. First and second legs of the U-shaped PC lenses 1203A may be configured to approximate the curvature of the magnifying mirror. A substantially rectangular reflector or diffuser 106 may abut the U-shaped PC lenses 1203A at the closed ends thereof and span a distance in a dimension parallel to the length of the flexible circuit board 108.

Figure 4B:
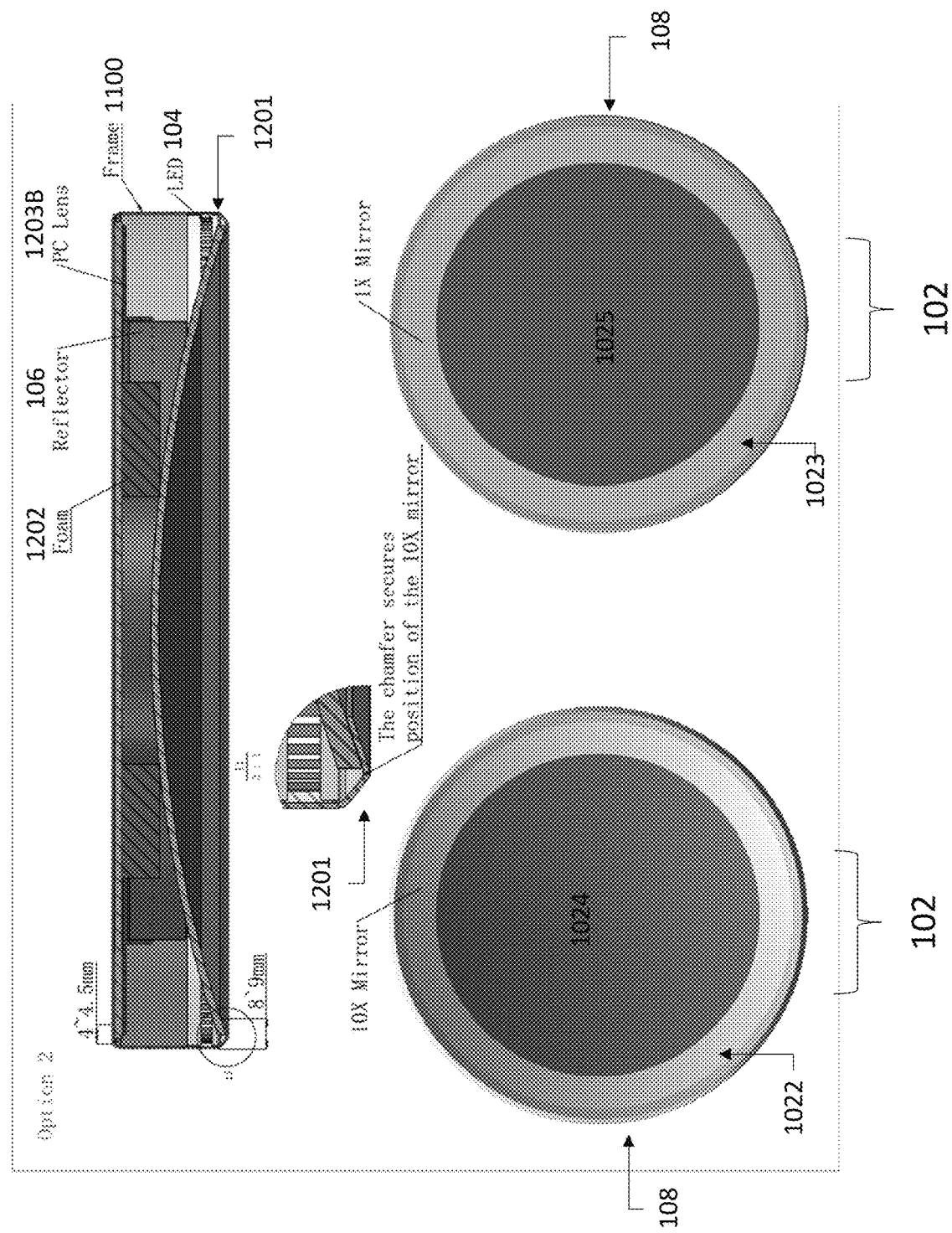
FIG. 4B is a cross-section of an exemplary mirror apparatus according to various embodiments.

FIG. 4B illustrates an exemplary reflective module interior 1028 configured to achieve improved light output and light distribution over conventional apparatuses. A flexible circuit board 108 having a length, width and thickness may be disposed in the frame 1100 as described above. The flexible circuit board 108 may define the circumference of a circle bounding the first reflective module face 1022 and second 1023 reflective module face as shown in the front perspective of FIG. 3B.

As shown in the cross-section of FIG. 4B, the plurality of reflective module LED packages 104 may be configured in a second posture. Thus, the reflective module LED packages 104 may span the length of the flexible circuit board 108 and may be offset relative to a medial axis of the flexible circuit board 108. The second posture may therefore configure the reflective module LED packages 104 nearer to the magnifying mirror. The flexible circuit board 108 may be configured such that it defines a chamfer 1201 that secures the position of the magnifying mirror. The chamfer 1201 may define a slope of the flexible circuit board 108, thereby preventing the magnifying mirror from slipping. A small distance, for example, approximately 8 mm or 9 mm may be left between the chamfer 1201 of the flexible circuit board 108 and the edges of the magnifying mirror. A distance of between 4 mm and 5 mm may be left between the edge of the flexible circuit board 108 and the edges of the flat mirror.

As shown in the cross-section of FIG. 4B, the arms of two substantially T-shaped PC lenses 1203B may abut the flat mirror. The stems of the T-shaped PC lenses 1203B may define a boundary around a diffuser or substantially rectangular reflector 106. The diffuser or substantially rectangular reflector 106 may abut the T-shaped PC lenses 1203B at the jutting ends thereof and span a distance parallel to the length of the flexible circuit board 108, but less than the full length of the circuit board 108. A foam cushion 1202 may be configured between the flat and magnifying mirrors for support, such that the foam cushion 1201 spans less than the diameter of the two mirrors. When viewed in the cross-section of FIG. 4B, the T-shaped PC lenses 1203B may be seen to flank the foam cushion 1202 and reflector 106 relative to the length of the flexible circuit board 108.

Figure 4C:
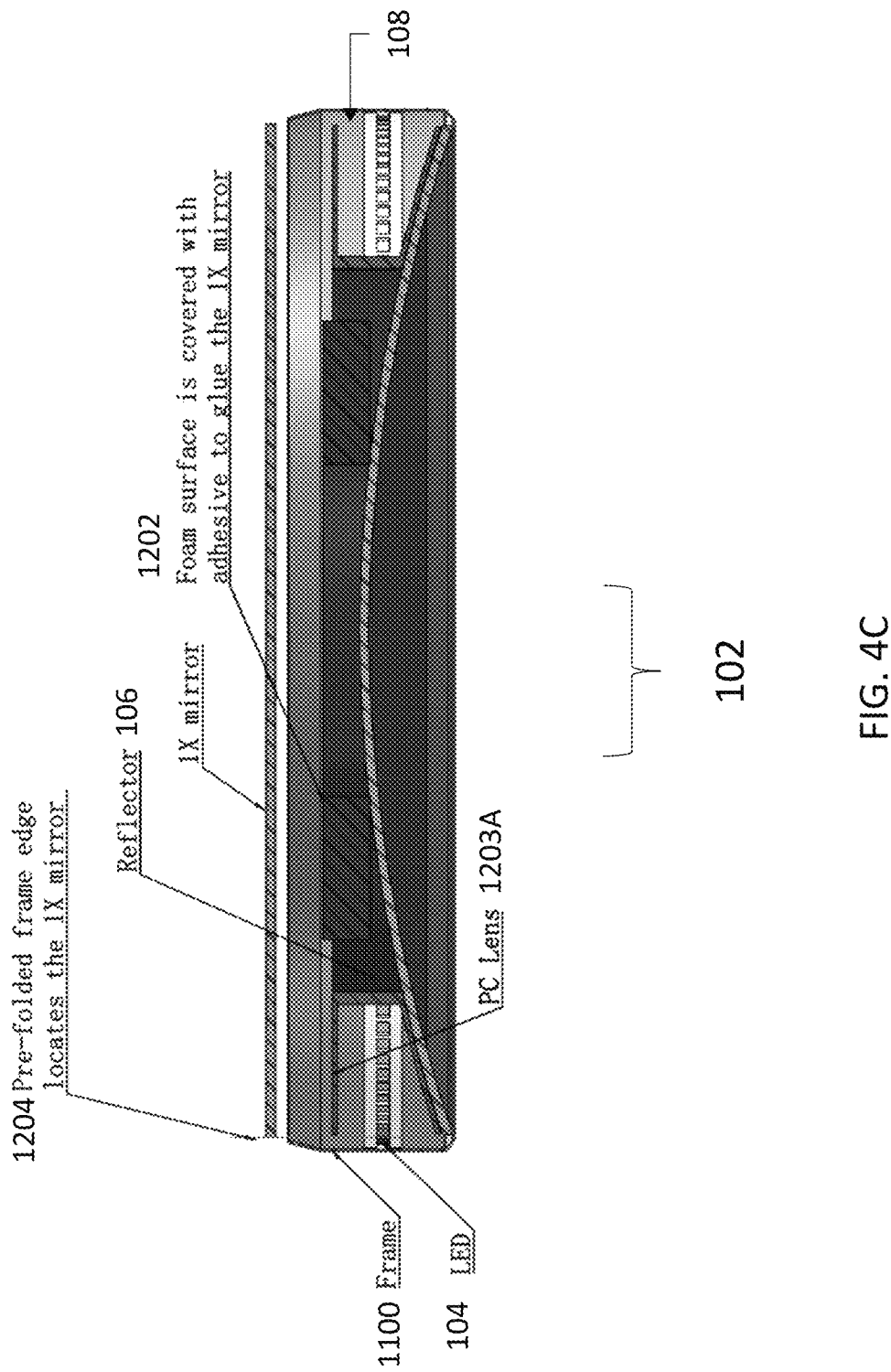
FIG. 4C is a cross-section of an exemplary mirror apparatus according to various embodiments.

FIG. 4C illustrates an exemplary reflective module interior 1028 configured to achieve improved light output and light distribution over conventional apparatuses. A flexible circuit board 108 having a length, width and thickness may be disposed in frame 1100 as described above. As shown in the cross-section of FIG. 4C, the reflective module LED packages 104 may span the length of the flexible circuit board 108 and may be relatively aligned with a medial axis of the flexible circuit board 108. The frame 1100 as described above may further be configured with a pre-folded edge 1204 so as to secure the flat mirror.

As shown in the cross-section of FIG. 4C, A foam cushion 1202 may be configured between the two mirrors for support such that the foam cushion 1202 spans a length less than the diameter of the two circular mirrors. The foam cushion 1202 may be adhered to the flat mirror by glue. Substantially U-shaped PC lenses 1203A may flank the foam cushion 1202, sitting in a plane parallel to the length of the flexible circuit board 108. A substantially rectangular reflector 106 may abut the U-shaped PC lenses 1203A at the closed ends thereof and span a distance in a dimension parallel to the length of the flexible circuit board 108.

Figure 5B:
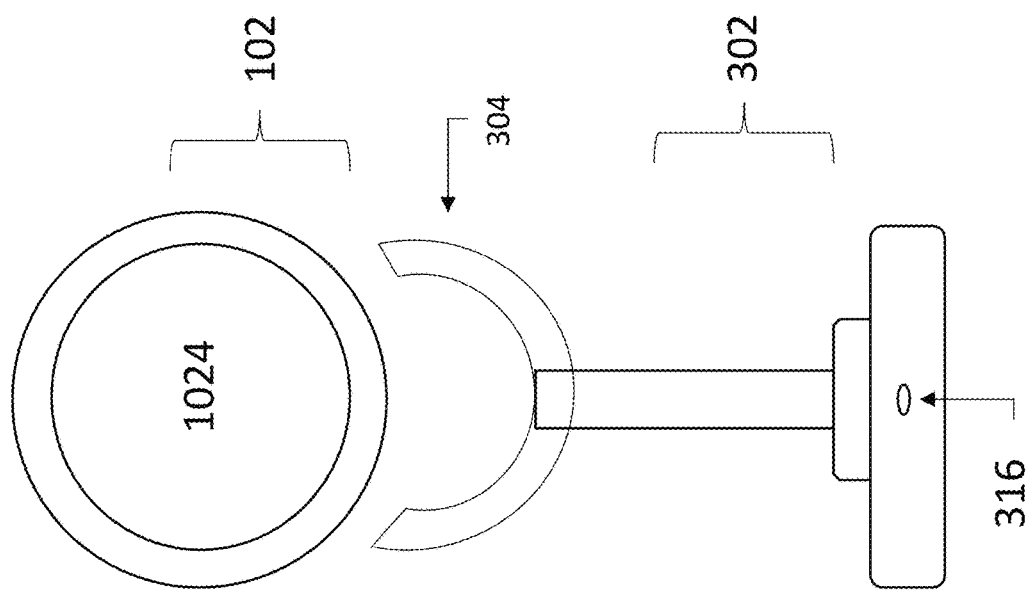
FIG. 5B is a front view of an exemplary mirror apparatus according to various embodiments.
Figure 5A:
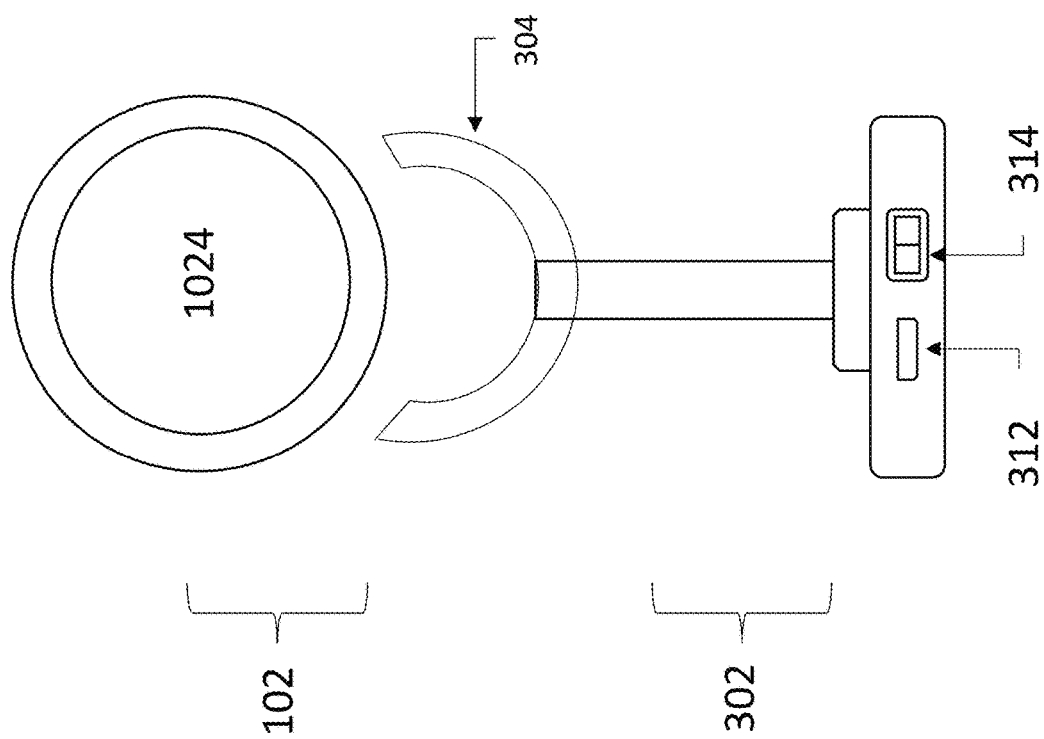
FIG. 5A is a back view of an exemplary mirror apparatus according to various embodiments.
Figure 5D:
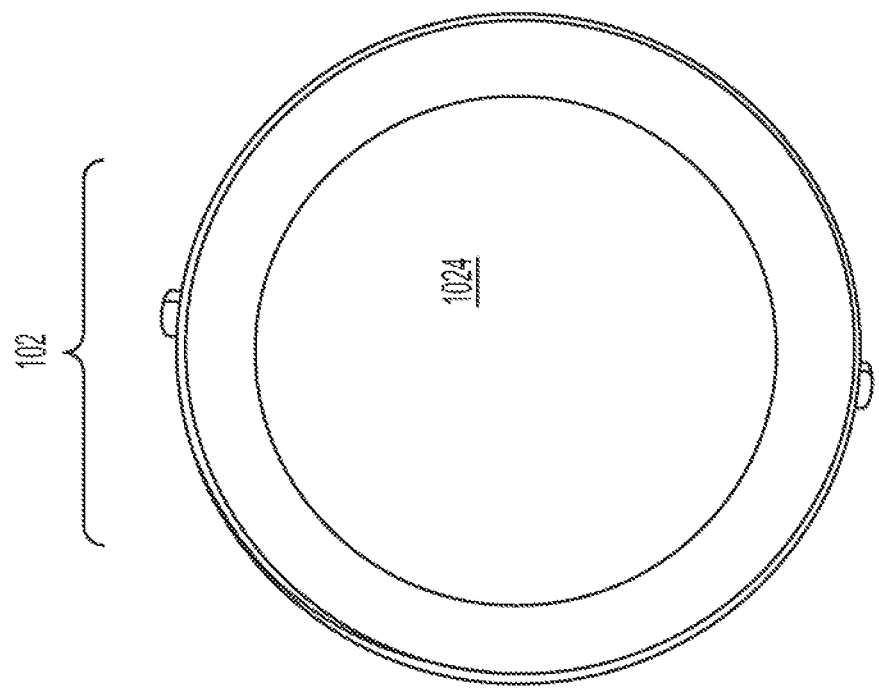
FIG. 5D is a front view an exemplary a reflective module of an exemplary mirror apparatus according to various embodiments.
Figure 5C:
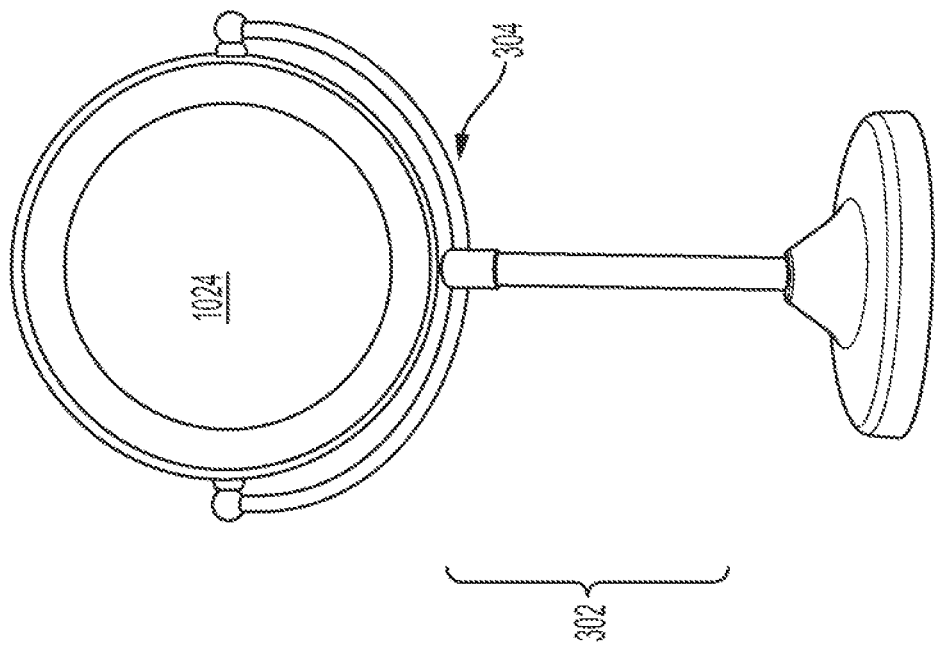
FIG. 5C is a front view of an exemplary reflective module base of a mirror apparatus according to various embodiments.

FIGS. 5A-5J illustrate an exemplary mirror apparatus according to preferred embodiments. In embodiments, an exemplary mirror apparatus may further comprise a reflective module base 302, as illustrated in FIGS. 5A-5C. Alternatively, and as illustrated in FIG. 5D, a mirror apparatus may comprise a reflective module 102 only. The reflective module base 302 may comprise materials suitable to achieve the form and function of a mirror apparatus 300. The reflective module base 302 of embodiments may comprise a reflective module coupling arm 304 configured to mechanically couple to the reflective module 102, so that a mirror apparatus 300 may be free-standing.

Turning now to FIGS. 5E-5J, the reflective module base 302 of a mirror apparatus 300 may comprise a reflective module base exterior 308 and a reflective module base interior 310. The reflective module base interior 310 may define a void configured to house wiring and other electronic components of a mirror apparatus 300. For example, a reflective module base 302 may further comprise a reflective module base end cap 316. The reflective module base end cap 316 may be configured to be removable from the reflective module base 302 so as to expose the reflective module base interior 310.

Figure 5H:
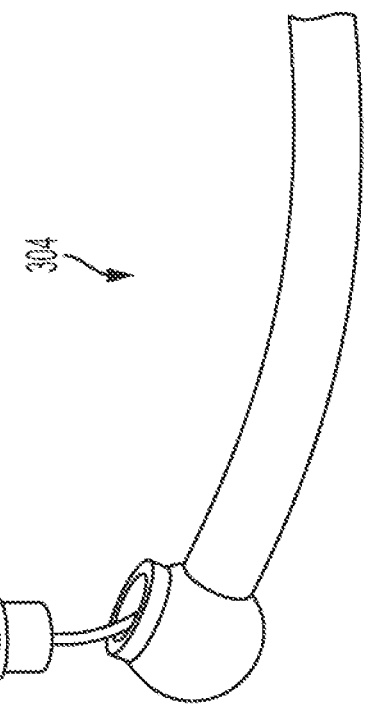
FIG. 5H is a perspective view of a reflective module coupling arm of an exemplary mirror apparatus according to various embodiments.
Figure 5G:
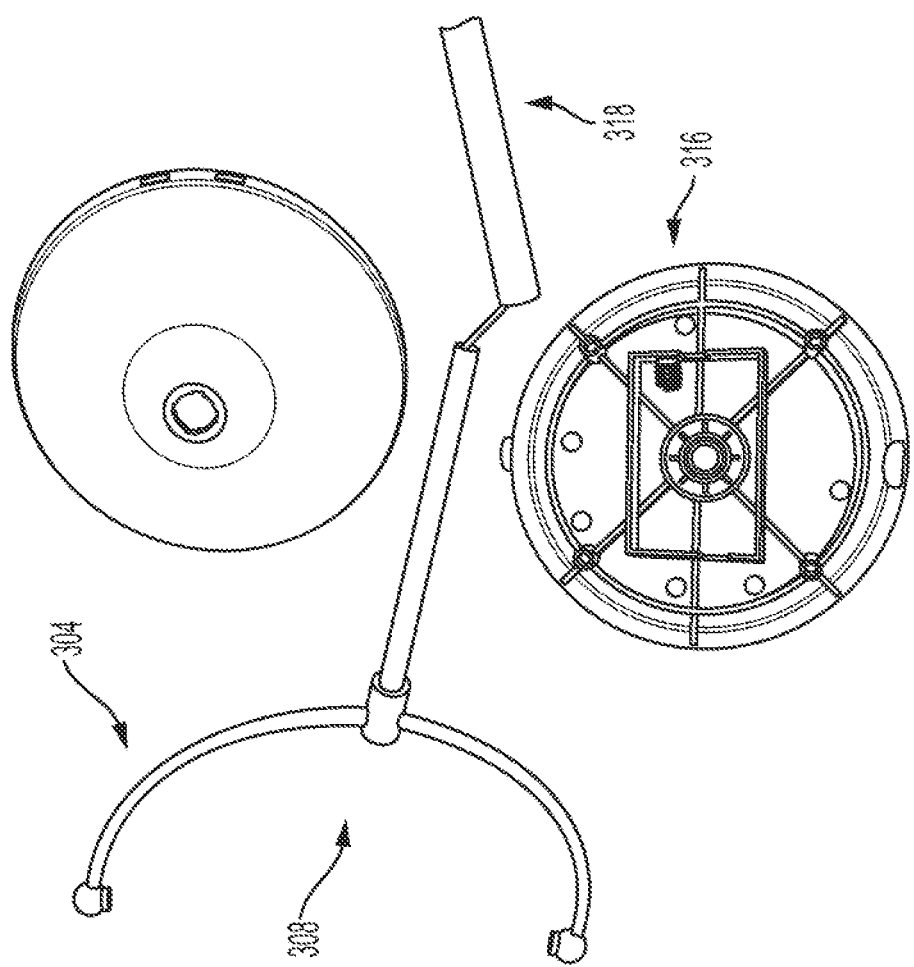
FIG. 5G is an exploded view of an exemplary reflective module base of an exemplary mirror apparatus according to various embodiments.

For example, as illustrated in FIGS. 5G-5H, the reflective module coupling arm 304 may comprise an inner void. The reflective module coupling arm 304 may comprise a first, substantially trident shaped component 308 and a second, cylindrical sleeve component 318. The cylindrical component 318 may define an inner void configured to house the trident shaped component 308 therein.

Figure 5J:
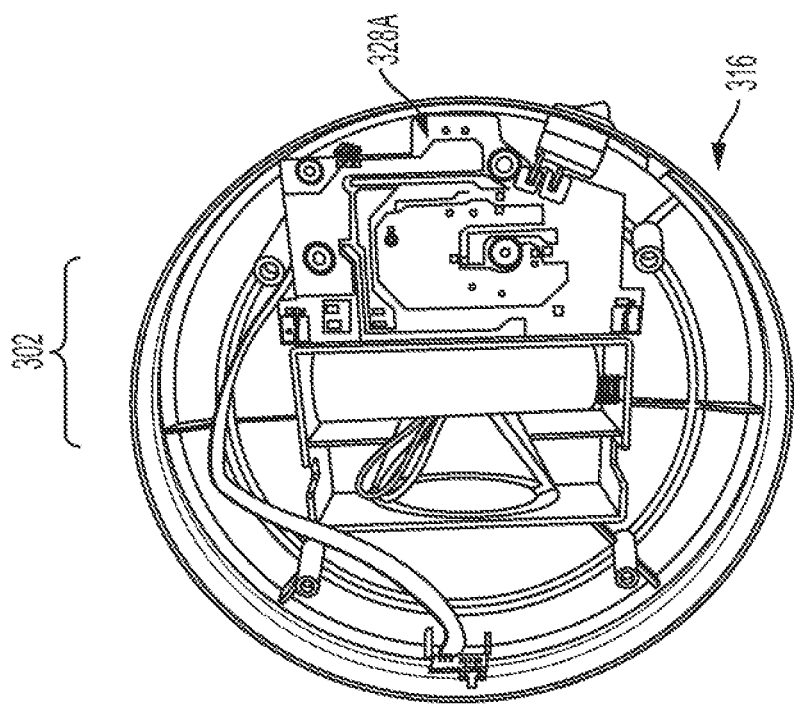
FIG. 5J is a perspective view of a reflective module base interior of an exemplary mirror apparatus according to various embodiments.
Figure 5I:
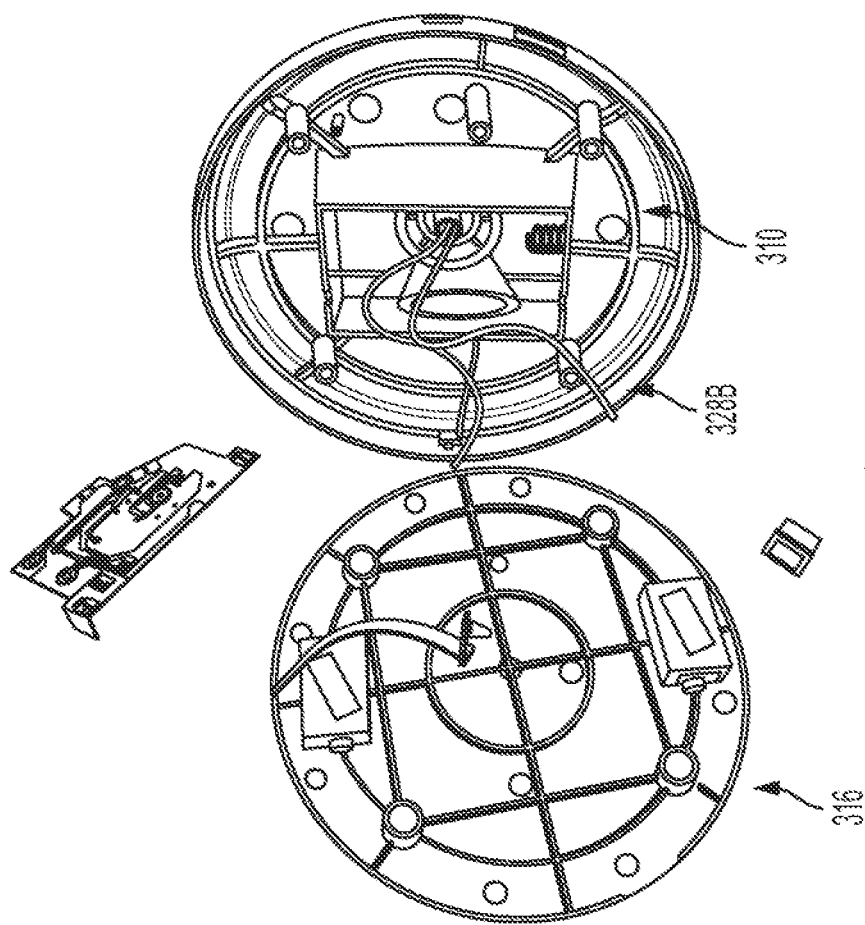
FIG. 5I is an exploded view of a reflective module base interior of an exemplary mirror apparatus according to various embodiments.

As shown in FIGS. 5I-5J, it may be desirable to achieve turning the mirror apparatus 300 on and/or off by simply touching the reflective module base 302 with the hand. The reflective module base 302 may therefore act as a touch sensor. To achieve this, the reflective module base interior 310 may house a sensor 328A equipped to detect changes in pressure, temperature, resistance, capacitance or the like, via the reflective module base 302, and wiring 328B for electrical communication between the sensor and reflective module LEDs 104 therein.

Figure 6:
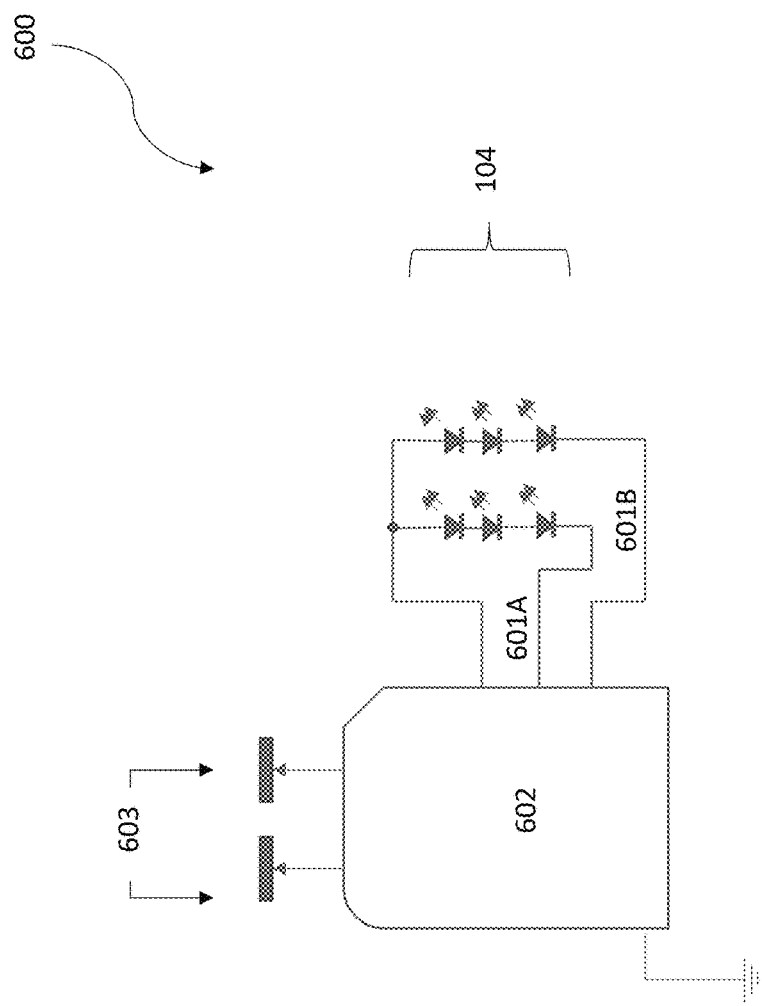
FIG. 6 is a schematic of exemplary circuitry that may be employed in an exemplary mirror apparatus according to various embodiments.

FIG. 6 illustrates circuitry that may be employed in the mirror apparatus 300 of an embodiment. The circuitry of FIG. 6 may be employed to tune the white light of the plurality of LED packages 104 to achieve more options for light quality over conventional apparatus. It is desirable to employ circuitry 600 capable of supporting a sufficient number of LED channels 601. Controllers 602 suitable to support multiple LED channels as generally known, such as Integrated MOSFETs, Current Sense Amplifiers, hysteretic controllers and/or the like may be employed. For example, the circuitry of FIG. 6 may comprise at least two LED channels 601A, 601B. One channel 601A may be dedicated to controlling warm white LEDs 104, the other channel 601B dedicated to controlling cool white LEDs 104. Each channel 601A, 601B may comprise a plurality of reflective module LED packages 104. Each channel 601A, 601B may be controlled 603 using a potentiometer, a dimmer switch, or any other suitable interface control choice. For example, when employing a dimmer switch, the circuitry 600 may carry dimming information in the voltage waveform and current that is delivered. The control parameters of the two channels 601A, 601B may be brightness and color temperature, or CRI and color temperature. The driver circuitry 600 may comprise suitable microcontrollers 602 or other components capable of tuning white reflective module LED packages 104 to control color temperature and/or CRI output. A suitable microcontroller 602 may therefore comprise an embedded control unit capable of controlling both brightness and color temperature.

In various embodiments, a mirror apparatus includes a reflective module. In some of these embodiments, the reflective module includes a first reflective module face, a reflective module interior, and a reflective module exterior. In some of these embodiments, the mirror apparatus further includes a flexible circuit board disposed within the reflective module interior. In some of these embodiments, the flexible circuit board has a first side and a second side. In some of these embodiments, the mirror apparatus further includes a plurality of reflective module LED packages disposed on and electrically connected to a first side of the flexible circuit board. In some of these embodiments, the plurality of LED packages are positioned outside a first reflective module surface periphery. In some of these embodiments, the plurality of LED packages are configured to transmit light out of a mirror apparatus face for illumination.

In some of these embodiments, the mirror apparatus further includes a reflective module LED diffuser.

In some of these embodiments, the flexible circuit board further includes a plurality of reflective module LED packages disposed on and electrically connected to the first side. In some of these embodiments, the flexible circuit board further includes a plurality of leads/traces disposed on and electrically and mechanically connected to the first or second side of the flexible circuit board and electrically connected with the plurality of reflective module LED packages. In some of these embodiments, the flexible circuit board further includes driver circuitry disposed on and electrically and mechanically connected with the first or second side. In some of these embodiments, the driver circuitry is electrically connected with the plurality of leads/traces of the flexible circuit board.

In some of these embodiments, the plurality of reflective module LED packages includes reflective module LED packages of differing optical qualities such as brightness, color temperature and CRI.

In some of these embodiments, the driver circuitry is configured to control a color temperature and CRI of the reflective module LED packages according to a predefined program.

In some of these embodiments, the mirror apparatus further includes a reflective module base. In some of these embodiments, the reflective module base includes a reflective module coupling arm. In some of these embodiments, the reflective module coupling arm is mechanically couplable to the reflective module so as to provide free-standing support. In some of these embodiments, the reflective module base further includes a reflective module base interior. In some of these embodiments, the reflective module base interior defines a void configured to house reflective module power components therein. In some of these embodiments, the reflective module base further includes a reflective module base exterior. In some of these embodiments, the reflective module base further includes a reflective module base charging port. In some of these embodiments, the reflective module base charging port is electrically connected to or couplable with the reflective module power components and configured to be mechanically and electrically connected to or couplable with an electrical outlet in order to charge the reflective module power components.

In some of these embodiments, the reflective module base further includes a reflective module power switch. In some of these embodiments, the reflective module power switch is electrically connected to the reflective module power components and configured to initiate and/or cease power delivery to the mirror apparatus.

In some of these embodiments, the reflective module base further includes a reflective module power indicator light. In some of these embodiments, the reflective module power indicator light is electrically connected to the reflective module power components and configured to provide visual indication of the power remaining in the reflective module power components.

In some of these embodiments, the flexible circuit board is thermally conductive.

In some of these embodiments, the flexible circuit board is mounted within the reflective module interior such that heat generated during an operation of the mirror apparatus is radiated out through the reflective module exterior.

In some of these embodiments, the first reflective module face includes the first reflective module surface. In some of these embodiments, the first reflective module surface defines the first reflective module surface periphery and spanning less than an entirety of the first reflective module face.

In some of these embodiments, the reflective module interior defines a void configured to house the plurality of reflective module LED packages therein.

In some of these embodiments, the reflective module face is configured to provide edge lighting.

In some of these embodiments, the reflective module includes a first reflective module face and a second reflective module face. In some of these embodiments, the first reflective module face includes a circularly shaped, concave magnifying mirror. In some of these embodiments, the second reflective module face includes a circularly shaped, flat mirror.

In some of these embodiments, one or more of the first reflective module face or the second reflective module face includes a first layer of reflective material overlaying a second composite layer comprising junction of a mirrored area and a frosted area. In some of these embodiments, the frosted area sits atop the mirrored area. In some of these embodiments, the mirrored area includes a metal layer coating of one or more of gold, silver, aluminum or chrome. In some of these embodiments, the frosted area includes a translucent substrate capable of transmitting light.

In some of these embodiments, a frame encases the reflective module face. In some of these embodiments, the frame includes an inverted U-shape. In some of these embodiments, one or more spacers is positioned between an outer edge of one or more of the first reflective module face or the second reflective module face and the frame. In some of these embodiments, the one or more spacers are configured to prevent edge lighting.

In some of these embodiments, the mirror apparatus further includes a first frame recess between an edge of the flexible circuit board and an edge of the circularly shaped, flat mirror. In some of these embodiments, the first frame recess has a width of approximately 4-5 mm.

In some of these embodiments, the flexible circuit board defines a chamfer that secures a position of the circularly shaped, concave magnifying mirror. In some of these embodiments, the chamfer defines a slope of the flexible circuit board.

In some of these embodiments, the mirror apparatus further includes a foam cushion positioned between the first reflective module face and the second reflective module face.

In some of these embodiments, the mirror apparatus further includes a distance of approximately 8 mm or 9 mm between the chamfer of the flexible circuit board and edges of the circularly shaped, concave magnifying mirror.

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A mirror apparatus, comprising:
   a reflective module, wherein the reflective module comprises at least a first reflective module face with a first reflective module surface, a reflective module interior, and a reflective module exterior;
   a frame having an inner surface defining an interior space that encases the reflective module face;
   a flexible circuit board disposed within the reflective module interior and positioned in close proximity to the inner surface of the frame, wherein the flexible circuit board comprises a first side facing the interior space and a second side facing the inner surface of the frame; and
   a plurality of reflective module LED packages disposed on and electrically connected to a first side of the flexible circuit board,
   wherein:
      each of the plurality of LED packages is configured to transmit light in a direction towards the interior space and outward from at least the first reflective module face of the mirror apparatus, and
      each of the plurality of LED packages is mounted to the inner surface of the frame.

2. The mirror apparatus of claim 1, further comprising a reflective module LED diffuser.

3. The mirror apparatus of claim 1, wherein the flexible circuit board is thermally conductive.

4. The mirror apparatus of claim 1, wherein the flexible circuit board is mounted within the reflective module interior such that heat generated during an operation of the mirror apparatus is radiated out through the reflective module exterior.

5. The mirror apparatus of claim 1, wherein the first reflective module face comprises the first reflective module surface, and wherein the first reflective module surface defines the periphery of the first reflective module surface and spans less than an entirety of the first reflective module face.

6. The mirror apparatus of claim 1, wherein the frame comprises an inverted U-shape.

7. The mirror apparatus of claim 1, wherein the reflective module face is configured to provide edge lighting.

8. The mirror apparatus of claim 7, wherein one or more of the first reflective module face or the second reflective module face comprises a first layer of reflective material overlaying a second composite layer comprising junction of a mirrored area and a frosted area.

9. The mirror apparatus of claim 8, wherein:
   the frosted area sits atop the mirrored area; and
   at least one of:
      the mirrored area comprises a metal layer coating of one or more of gold, silver, aluminum, or chrome; or
      the frosted area comprises a translucent substrate capable of transmitting light.

10. The mirror apparatus of claim 8, wherein one or more spacers are positioned between an outer edge of one or more of the first reflective module face or the second reflective module face and the frame.

11. The mirror apparatus of claim 7, wherein the reflective module comprises a first reflective module face and a second reflective module face.

12. The mirror apparatus of claim 11, further comprising a foam cushion positioned between the first reflective module face and the second reflective module face.

13. The mirror apparatus of claim 11, wherein at least one of:
   the first reflective module face comprises a circularly shaped, concave magnifying mirror; or
   the second reflective module face comprises a circularly shaped, flat mirror.

14. The mirror apparatus of claim 13, wherein:
   the second reflective module face comprises a circularly shaped, flat mirror; and
   the mirror apparatus further comprises a first frame recess between an edge of the flexible circuit board and an edge of the circularly shaped, flat mirror.

15. The mirror apparatus of claim 13, wherein the flexible circuit board defines a chamfer that one or more of secures a position of the circularly shaped, concave magnifying mirror, or defines a slope of the flexible circuit board.

16. The mirror apparatus of claim 1, wherein the flexible circuit board further comprises:
   a plurality of leads/traces disposed on the first side or a second side of the flexible circuit board and electrically connected with the plurality of reflective module LED packages; and
   driver circuitry disposed on the first side or second side, wherein the driver circuitry is electrically connected with the plurality of leads/traces disposed on the flexible circuit board.

17. The mirror apparatus of claim 16, wherein the plurality of reflective module LED packages comprises at least one of the reflective module LED packages having different optical qualities from at least one other of the LED packages.

18. The mirror apparatus of claim 16, wherein the driver circuitry is configured to control or adjust one or more of a color temperature or CRI of the reflective module LED packages according to a program.

19. The mirror apparatus of claim 18, wherein the mirror apparatus further comprises a reflective module base that comprises:
   a reflective module coupling arm, wherein the reflective module coupling arm is mechanically couplable to the reflective module so as to provide free-standing support;
   a reflective module base interior, wherein the reflective module base interior defines a void configured to house reflective module power components therein; and
   a reflective module base exterior.

20. The mirror apparatus of claim 19, wherein the reflective module base further comprises:
   a reflective module base charging port, wherein the reflective module base charging port is electrically couplable with the reflective module power components and configured to be couplable with an electrical outlet in order to charge the reflective module power components.

21. The mirror apparatus of claim 20, wherein the reflective module base further comprises:
   a reflective module power switch, wherein the reflective module power switch is electrically couplable with the reflective module power components and configured to initiate and/or cease power delivery to the mirror apparatus.

22. The mirror apparatus of claim 21, wherein the reflective module base further comprises:
   a reflective module power indicator light, wherein the reflective module power indicator light is electrically couplable with the reflective module power components and configured to provide visual indication of the power remaining in the reflective module power components.

23. A mirror apparatus, comprising:
a reflective module, wherein the reflective module comprises at least a circularly shaped, concave magnifying mirror, a circularly shaped, flat mirror, a reflective module interior, and a reflective module exterior;
a flexible circuit board disposed within the reflective module interior, wherein the flexible circuit board comprises a first side and a second side; and
a plurality of reflective module LED packages disposed on and electrically connected to a first side of the flexible circuit board, wherein each of the plurality of LED packages is positioned outside a periphery of the circularly shaped, concave magnifying mirror and configured to transmit light in a direction outward relative thereto,
wherein:
the reflective module is configured to provide edge lighting, and
the flexible circuit board defines a chamfer that one or more of secures a position of the circularly shaped, concave magnifying mirror, or defines a slope of the flexible circuit board.

24. A mirror apparatus, comprising:
a reflective module, wherein the reflective module comprises at least a first reflective module face with a first reflective module surface, a reflective module interior, and a reflective module exterior;
a frame having an inner surface defining an interior space that encases the reflective module;
a flexible circuit board disposed within the reflective module interior, wherein the flexible circuit board comprises a first side and a second side; and
a plurality of reflective module LED packages disposed on and electrically connected to a first side of the flexible circuit board, wherein the plurality of LED packages are positioned outside a periphery of the first reflective module surface, and
wherein:
the plurality of LED packages are configured to transmit light in a direction outward from at least the first reflective module face of the mirror apparatus,
the reflective module face is configured to provide edge lighting,
at least the first reflective module face comprises a first layer of reflective material overlaying a second composite layer comprising junction of a mirrored area and a frosted area, and
one or more spacers are positioned between an outer edge of at least the first reflective module face and the frame.

* * * * *